United States Patent
Sugiyama

(10) Patent No.: US 12,425,939 B2
(45) Date of Patent: Sep. 23, 2025

(54) TRIGGERING OF CELL RESELECTION EVALUATION PROCESS IN NON-TERRESTRIAL NETWORK

(71) Applicant: Sharp Kabushiki Kaisha, Sakai (JP)

(72) Inventor: Edward Masami Sugiyama, Vancouver, WA (US)

(73) Assignee: Sharp Kabushiki Kaisha, Osaka (JP)

(*) Notice: Subject to any disclaimer, the term of this patent is extended or adjusted under 35 U.S.C. 154(b) by 450 days.

(21) Appl. No.: 17/956,736

(22) Filed: Sep. 29, 2022

(65) Prior Publication Data
US 2024/0049082 A1   Feb. 8, 2024

(51) Int. Cl.
*H04B 7/185*   (2006.01)
*H04W 36/04*   (2009.01)

(52) U.S. Cl.
CPC ........ *H04W 36/04* (2013.01); *H04B 7/18513* (2013.01)

(58) Field of Classification Search
CPC .............. H04B 7/18513; H04W 84/06; H04W 36/0085; H04W 36/04; H04W 36/083
See application file for complete search history.

(56) References Cited

U.S. PATENT DOCUMENTS

| 5,440,491 | A * | 8/1995 | Kawano | ................ | G01S 19/071 342/463 |
| 2022/0110028 | A1 | 4/2022 | You | | |
| 2023/0209420 | A1 | 6/2023 | Xie et al. | | |
| 2023/0269635 | A1 * | 8/2023 | Xu | ........................ | H04W 48/20 370/329 |
| 2024/0056931 | A1 * | 2/2024 | Lin | ...................... | H04W 36/305 |

FOREIGN PATENT DOCUMENTS

| WO | 2022042532 A1 | 3/2022 | | |
| WO | 2022151186 A1 | 7/2022 | | |
| WO | 2022151259 A1 | 7/2022 | | |
| WO | WO-2022188088 A1 * | 9/2022 | ............ | H04W 36/08 |

OTHER PUBLICATIONS

3GPP TS 36.133 V17.6.0, 3rd Generation Partnership Project; Technical Specification Group Radio Access Network; Evolved Universal Terrestrial Radio Access (E-UTRA); Requirements for support of radio resource management (Release 17), Jun. 2022.
3GPP TS 36.304 V17.1.0, 3rd Generation Partnership Project; Technical Specification Group Radio Access Network; Evolved Universal Terrestrial Radio Access (E-UTRA); User Equipment (UE) procedures in idle mode (Release 17), Jun. 2022.
3GPP TS 36.331 V17.1.0, 3rd Generation Partnership Project; Technical Specification Group Radio Access Network; Evolved Universal Terrestrial Radio Access (E-UTRA); Radio Resource Control (RRC); Protocol specification (Release 17), Jun. 2022.

* cited by examiner

*Primary Examiner* — Khalid W Shaheed
(74) *Attorney, Agent, or Firm* — Austin Rapp

(57) ABSTRACT

A wireless terminal is described. The wireless terminal includes receiving circuitry configured to calculate a distance to a satellite slope to determine triggering of a cell reselection process.

5 Claims, 37 Drawing Sheets

TRIGGERING OF CELL RESELECTION EVALUATION PROCESS IN NON-TERRESTRIAL NETWORK

TECHNICAL FIELD

The present disclosure relates generally to communication systems. More specifically, the present disclosure relates to triggering of cell reselection evaluation process in non-terrestrial network.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility, and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
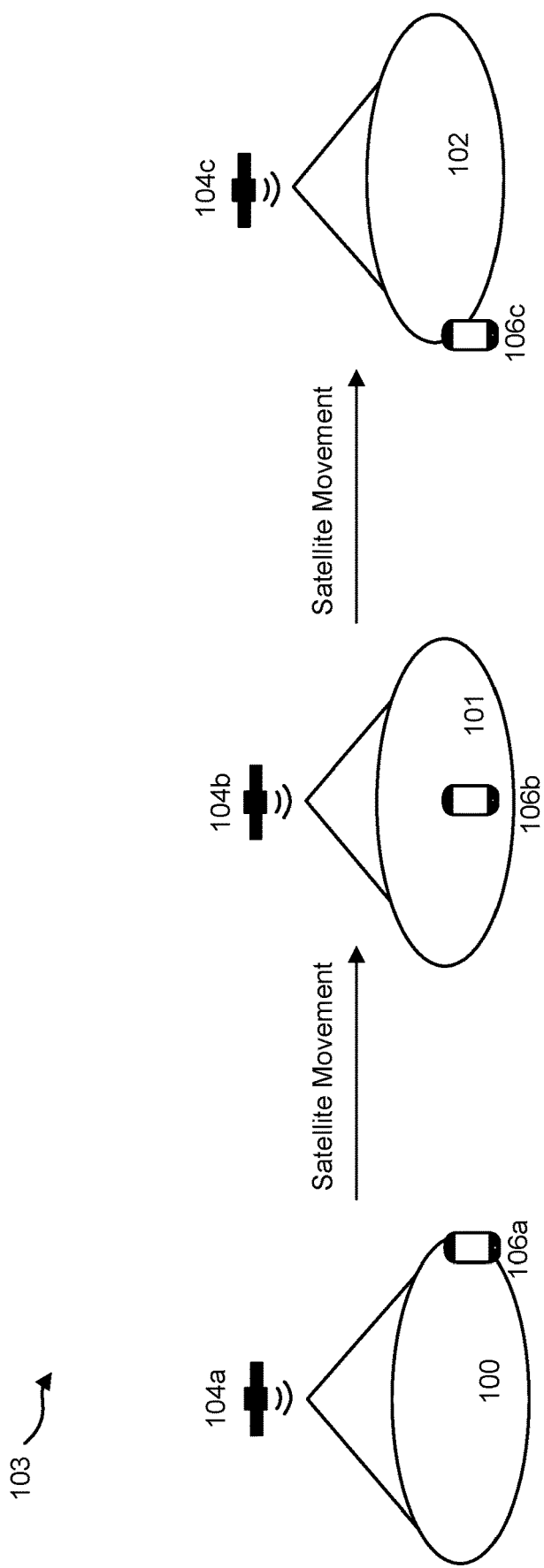
FIG. 1 is a diagram illustrating wireless terminals in communication with satellites.

A wireless terminal is described. The wireless terminal may include receiving circuitry configured to calculate a distance to a satellite slope to determine triggering of a cell reselection process.

Calculating the distance to the satellite slope for the wireless terminal may comprise calculating a trend of the satellite distance to determine triggering of the cell reselection process.

The receiving circuitry of the wireless terminal may be further configured to use the distance to determine a start of idle mode neighbor measurements.

The wireless terminal may be using a non-terrestrial network (NTN).

A base station (gNB) is described. The gNB may include transmitting circuitry configured to transmit a satellite distance value.

The satellite distance value of the gNB may comprise a satellite distance slope timer value.

The satellite distance value of the gNB may further comprise a satellite distance threshold value.

A method by a wireless terminal is described. The method may include receiving a neighbor cell signal. The method may also include calculating a distance to a satellite slope to determine triggering of a cell reselection process.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a wireless terminal, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a wireless terminal. However, as the scope of the present disclosure should not be limited to the 3GPP standards, the terms "wireless terminal" and "wireless communication device" may be used interchangeably herein to mean the more general term "wireless communication device." A wireless terminal may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and/or "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a wireless terminal. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the wireless terminal is aware and is allowed by an eNB to transmit or receive information. "Configured cell(s)" may be serving cell(s). The wireless terminal may receive system information and perform the required measurements on all configured cells. "Configured cell(s)" for a radio connection may include a primary cell and/or no, one, or more secondary cell(s). "Activated cells" are those configured cells on which the wireless terminal is transmitting and receiving. That is, activated cells are those cells for which the wireless terminal monitors the physical downlink control channel (PDCCH) and in the case of a downlink transmission, those cells for which the wireless terminal decodes a physical downlink shared channel (PDSCH). "Deactivated cells" are those configured cells that the wireless terminal is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio," "New Radio Access Technology" or "NR" by 3GPP) envisions the use of time, frequency and/or space resources to allow for enhanced mobile broadband (eMBB) communication and ultra-reliable low-latency communication (URLLC) services, as well as massive machine type communication (MMTC) like services. To meet a latency target and high reliability, mini-slot-based repetitions with flexible transmission occasions may be supported. Approaches for applying mini-slot-based repetitions are described herein. A new radio (NR) base station may be referred to as a gNB. A gNB may also be more generally referred to as a base station device.

One important objective of 5G is to enable connected industries. 5G connectivity can serve as a catalyst for the next wave of industrial transformation and digitalization, which improve flexibility, enhance productivity and efficiency, reduce maintenance cost, and improve operational safety. Devices in such environments may include, for example, pressure sensors, humidity sensors, thermometers, motion sensors, accelerometers, actuators, etc. It is desirable to connect these sensors and actuators to 5G networks and core. The massive industrial wireless sensor network (IWSN) use cases and requirements include not only URLLC services with very high requirements, but also relatively low-end services with the requirement of small device form factors, and/or being completely wireless with a battery life of several years. The requirements for these services that are higher than low power wide area (LPWA) (e.g., LTE-MTC and/or Narrowband Internet of Things (LTE-M/NB-IOT)) but lower than URLLC and eMBB.

A non-terrestrial network (NTN) refers to a network, or segment of networks using radio frequency (RF) resources onboard a satellite (or UAS platform). Non-Terrestrial Network typically features the following elements: one or several sat-gateways that connect the Non-Terrestrial Network to a public data network. For example, a Geostationary Earth Orbiting (GEO) satellite is fed by one or several sat-gateways which are deployed across the satellite targeted coverage (e.g., regional or even continental coverage). It may be assumed that wireless terminal in a cell are served by only one sat-gateway. A Non-GEO satellite served successively by one or several sat-gateways at a time. The system ensures service and feeder link continuity between the successive serving sat-gateways with sufficient time duration to proceed with mobility anchoring and hand-over.

Additionally, Non-Terrestrial Network typically features the following elements: a Feeder link or radio link between a sat-gateway and the satellite (or Unmanned Aircraft System (UAS) platform), a service link or radio link between the wireless terminal and the satellite (or UAS platform).

Additionally, Non-Terrestrial Network typically features the following elements: a satellite (or UAS platform) which may implement either a transparent or a regenerative (with onboard processing) payload. The satellite (or Unmanned Aircraft System (UAS) platform) may generate several beams over a given service area bounded by its field of view. The footprints of the beams are typically of elliptic shape. The field of view of a satellite (or UAS platform) depends on the onboard antenna diagram and min elevation angle. For a transparent payload, radio frequency filtering, frequency conversion and amplification may be applied. Hence, the waveform signal repeated by the payload is un-changed. For a regenerative payload, radio frequency filtering, frequency conversion and amplification as well as demodulation/decoding, switch and/or routing, coding/modulation may be applied. This is effectively equivalent to having all or part of base station functions (e.g., gNB) onboard the satellite (or UAS platform).

Additionally, Non-Terrestrial Network may optionally feature the following elements: Inter-satellite links (ISL) optionally in case of a constellation of satellites. This will require regenerative payloads onboard the satellites. ISL may operate in RF frequency or optical bands.

Additionally, Non-Terrestrial Network typically features the following elements: User Equipment may be served by the satellite (or UAS platform) within the targeted service area.

There may be different types of satellites (or UAS platforms): Low-Earth Orbit (LEO) satellite, Medium-Earth Orbit (MEO) satellite, Geostationary Earth Orbit (GEO) satellite, UAS platform (including HAPS) and High Elliptical Orbit (HEO) satellite. Detailed descriptions are shown in Table-1.

Typically, GEO satellites and UAS are used to provide continental, regional or local service. A constellation of LEO and MEO may be used to provide services in both Northern and Southern hemispheres. In some cases, the constellation can even provide global coverage including polar regions. For the later, this requires appropriate orbit inclination, sufficient beams generated and inter-satellite links.

Non-terrestrial networks may provide access to wireless terminal in six reference scenarios including: Circular orbiting and notional station keeping platforms, highest round trip delay (RTD) constraint, highest Doppler constraint, a transparent and a regenerative payload, one ISL case and one without ISL (Regenerative payload is mandatory in the case of inter-satellite links), fixed or steerable beams resulting respectively in moving or fixed beam foot print on the ground.

This disclosure considers non-terrestrial networks for IoT service providing access to NB-IoT/eMTC user equipment in reference scenarios including at least: GEO and LEO orbiting scenarios, No inter-satellite link, Transparent payload, Fixed or steerable beams resulting respectively in moving or fixed beam footprint on the ground, Sub 6 GHz bands of interest. IoT NTN scenarios A, B, C and D may be included in the study as shown in Table-2 below:

TABLE 2

| NTN Configurations | Transparent satellite |
| --- | --- |
| GEO based non-terrestrial access network | Scenario A |
| LEO based non-terrestrial access network generating steerable beams (altitude 1200 km and 600 km) | Scenario B |
| LEO based non-terrestrial access network generating fixed beams whose footprints move with the satellite (altitude 1200 km and 600 km) | Scenario C |
| MEO based non-terrestrial access network generating fixed beams whose footprints move with the satellite (altitude 10000 km) | Scenario D |

IoT NTN connectivity via EPC may be supported. Alternatively or additionally, IoT NTN connectivity via 5GC may be supported.

GNSS capability in the wireless terminal may or may not be supported for both NB-IoT and eMTC devices. Simultaneous GNSS and NTN NB-IoT/eMTC operation may or may not be assumed. All cellular IoT features specified up to Rel-16 may be supported for IoT NTN. Both NB-IoT multi-carrier operation and NB-IoT single-carrier operation may supported for IoT NTN.

This disclosure introduces examples of a wireless terminal feature and parameter list with NTN support to serve the use cases mentioned above.

TABLE 1

| Platforms | Altitude range | Orbit | Typical beam footprint size |
| --- | --- | --- | --- |
| Low-Earth Orbit (LEO) satellite | 300-1500 km | Circular around the earth | 100-1000 km |
| Medium-Earth Orbit (MEO) satellite | 7000-25000 km | | 100-1000 km |
| Geostationary Earth Orbit (GEO) satellite | 35 786 km | Notional station keeping position fixed in terms of elevation/azimuth with respect to a given earth point | 200-3500 km |
| UAS platform (including HAPS) | 8-50 km (20 km for HAPS) | | 5-200 km |
| High Elliptical Orbit (HEO) satellite | 400-50000 km | Elliptical around the earth | 200-3500 km |

Some configurations of the systems and methods described herein teach approaches for NTN transmission and/or retransmission management to meet the constraints and requirements mentioned above.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

Wireless terminals, that may include Narrowband Internet of Things (NB-IoT), are usually stationary or moving at low speeds. Cell reselections while in idle mode do not occur frequently. However, with wireless terminals connected to a Non-Terrestrial Network (NTN) the following issues may occur:

1) Excessive neighbor cell measurement requests
2) Excessive cell reselections

For some wireless terminals, multiple cell reselections may decrease battery life.

Satellites such as Low Earth Orbit (LEO) and Middle Earth Orbit (MEO) are constantly moving in a orbital path at high speeds often leading to frequent handovers or cell reselection even if the wireless terminals are stationary. As a result, the satellite coverage footprint area changes with time. Even if the wireless terminal that utilize NTN may encounter changing levels of received power ($S_{rxlevel}$)) and even periods of no coverage (discontinuous service).

Excessive neighbor cell measurement requests are triggered by $S_{rxlevel}$ falling below a specified threshold. Additionally, based on the values of neighbor cell measurements, the wireless terminal may switch cell resulting in cell reselection.

Relaxed monitoring is one solution used for wireless terminals that may benefit from reduced power consumption. In 3GPP document TS 33.304, section 5.2.4.12, a timer and serving cell receive power level thresholds are transmitted from the network to wireless terminal. If the wireless terminal supports relaxed monitoring, then this feature intends to reduce the radio resource management (RRM) monitoring during cell reselection. Network signals the wireless terminal with a reference signal received power (RSRP) delta threshold. When changes in received power level in the current serving cell do not exceed the given threshold, then the wireless terminal does not need to monitor the neighbor cells for 24 hours.

However, this solution applies mostly to wireless terminals that are stationary and connected to a fixed location terrestrial network. The solution does not address discontinuous coverage and changes in serving cell received power encountered using NTN.

This disclosure proposes methods to reduce idle mode neighbor measurements and determine best suited time to trigger reselection in wireless terminals that are using non-terrestrial networks (NTN). Specifically:

A wireless terminal that utilizes distance to satellite to calculate slope values to determine start of idle mode neighbor measurements A wireless terminal that utilizes distance to satellite to calculate trend to determine start of idle mode neighbor measurements This disclosure further proposes methods to reduce idle mode neighbor measurements and determine best suited cell for reselection in wireless terminals that are using non-terrestrial networks (NTN). Specifically:

A wireless terminal that determines best suited NTN neighbor cell for reselection A wireless terminal that calculates elevation angle slope to determine triggering of serving cell receive power level ($S_{rxlevel}$) measurements for cell reselection A wireless terminal that calculates elevation angle trend to determine triggering of serving cell receive power level ($S_{rxlevel}$) measurements for cell reselection A wireless terminal that calculates received power level slope to determine triggering of cell reselection evaluation A wireless terminal that calculates received power level trend to determine triggering of cell reselection evaluation One of the Key Performance Indicator (KPI) for a wireless terminal may include battery life. However, execution of $S_{rxlevel}$ measurement along with acquiring neighbor cell information may reduce battery life. Current standard (36.133) states that serving cell measurements are performed every DRX cycle. Reduction of serving cell measurements may also decrease the number of cell reselection evaluation procedure, hence increasing the battery life further.

FIG. 1 is a diagram 103 illustrating a wireless terminal 106 in communication with a satellite 104 over a period of time. The satellite 104 at time t1 is shown as satellite 104a. The wireless terminal 106 at time t1 is shown as wireless terminal 106a. The satellite 104 at later time t2 is shown as satellite 104b. The wireless terminal 106 at time t2 is shown as wireless terminal 106b. The satellite 104 at even later time t3 is shown as satellite 104c. The wireless terminal 106 at time t3 is shown as wireless terminal 106c. The wireless terminal (106a, 106b, 106c) may search for best suited cell using evaluation process of cell reselection. While in idle mode, the wireless terminal (106a, 106b, 106c) may be camped on a serving cell of a satellite (104a, 104b, 104c). During this state, received power level, $S_{rxlevel}$, may be measured and compared with intra ($S_{IntraSearchP}$) and/or inter frequency ($S_{NonIntraSearchP}$) cell reselection threshold values. Time period to perform serving cell measurements is defined in TS36.133 and is dependent on device type and coverage (regular or enhanced). If the wireless terminal 106b is in regular coverage 101, the measurement period may be set to DRX. A wireless terminals (106a, 106b, 106c) connected to a satellite such as Low Earth Orbit (LEO) and Middle Earth Orbit (MEO) will experience a "moving" coverage area (100, 101, 102) as depicted in FIG. 1. When a satellite approaches a fixed location wireless terminal 106a, coverage begins 100. Because the satellite moves, the coverage area (100, 101, 102) shifts even though the wireless terminal (106a, 106b, 106c) is stationary. The coverage 102 eventually disappears because satellite moves away from the wireless terminal (106a, 106b, 106c).

Figure 2:
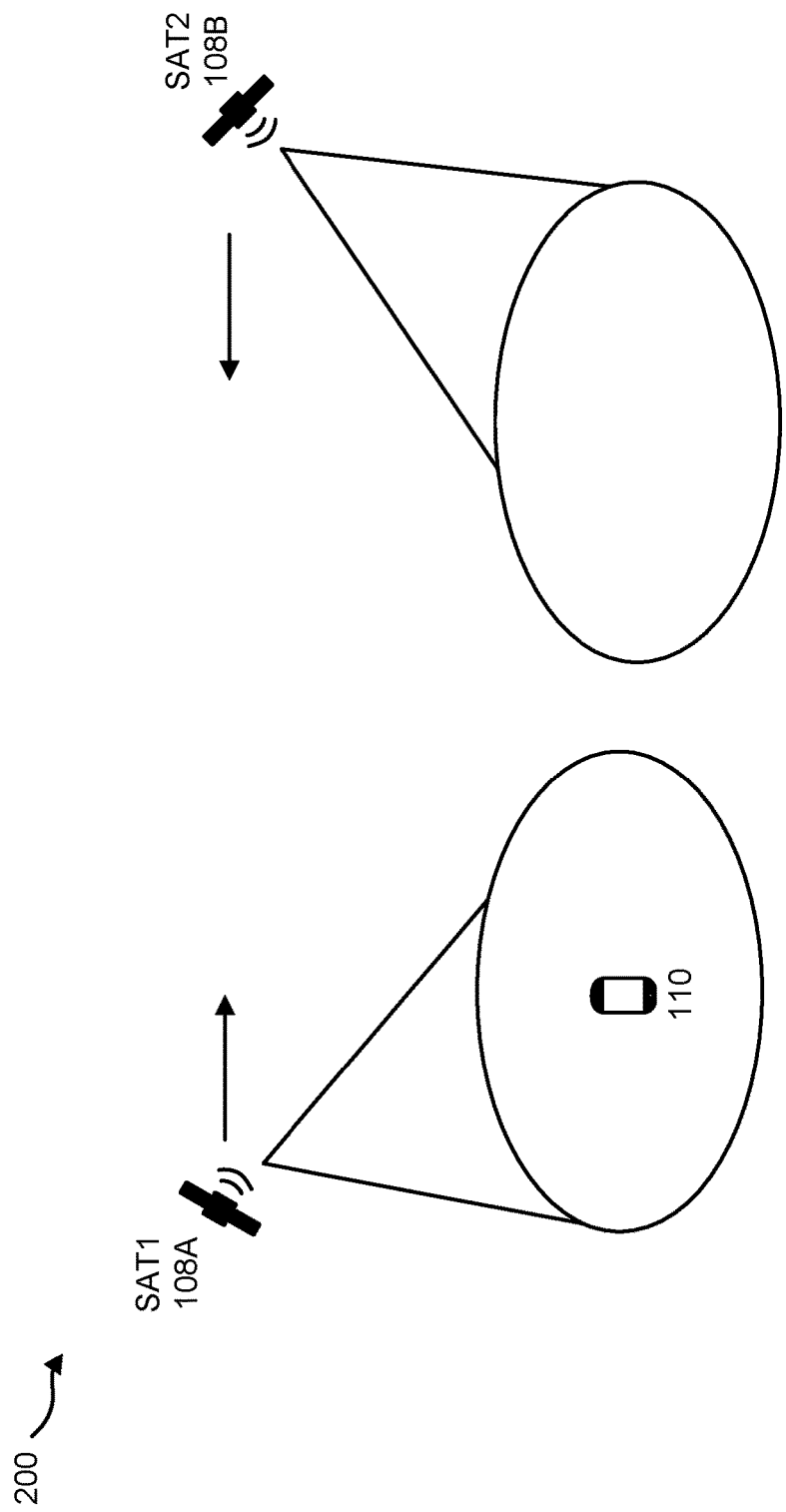
FIG. 2 is a diagram illustrating satellites on different orbit paths.

FIG. 2 is a diagram 200 illustrating satellites on different orbit paths. There may be another satellite 108A with a different orbit path approaching the wireless terminal 110 as depicted in FIG. 2. The wireless terminal 110 may be camped on cell of SAT1 108A while SAT2 108B with a different cell may head towards the wireless terminal 110.

Figure 3:
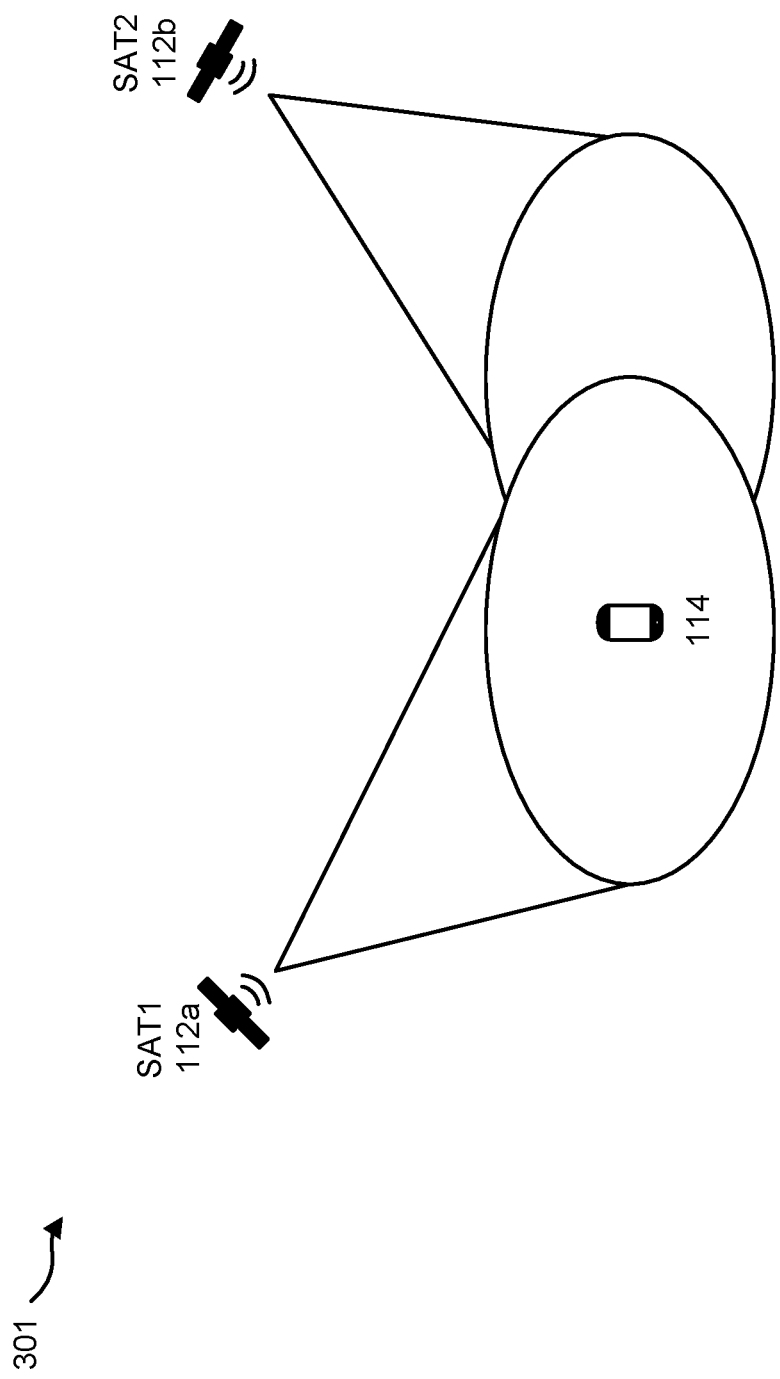
FIG. 3 is a diagram illustrating satellites with intersecting coverage areas.

FIG. 3 is a diagram 301 illustrating satellites with intersecting coverage areas. Later, the satellite coverage areas may intersect as depicted in FIG. 3. SAT2 112b approaches wireless terminal 114 that is camped on SAT1 112a while in idle mode. The wireless terminal 114 may perform serving cell received power measurements for cell reselection evaluation process. If a suitable cell is found, the wireless terminal 114 may camp on the suitable cell before transitioning back to idle mode. In this example the suitable cell may be SAT2 112b. Once in idle mode the measurement process is repeated so that the wireless terminal 114 may constantly find a suitable cell to camp on. However, before SAT2 112b approaches the SAT1 112a coverage area, the wireless terminal 114 may measure received power signal and perform cell reselection evaluations repeatedly even though additional cells may not be available. For wireless terminals 114 that require reduced power consumption, repeated measurements and cell reselections may result in decreased battery life.

This disclosure aims to reduce cell measurements and cell reselections for wireless terminal by utilizing satellite elevation angle and serving cell received power level information to determine ideal time to perform cell measurements and cell reselection.

Embodiment 1

Figure 4:
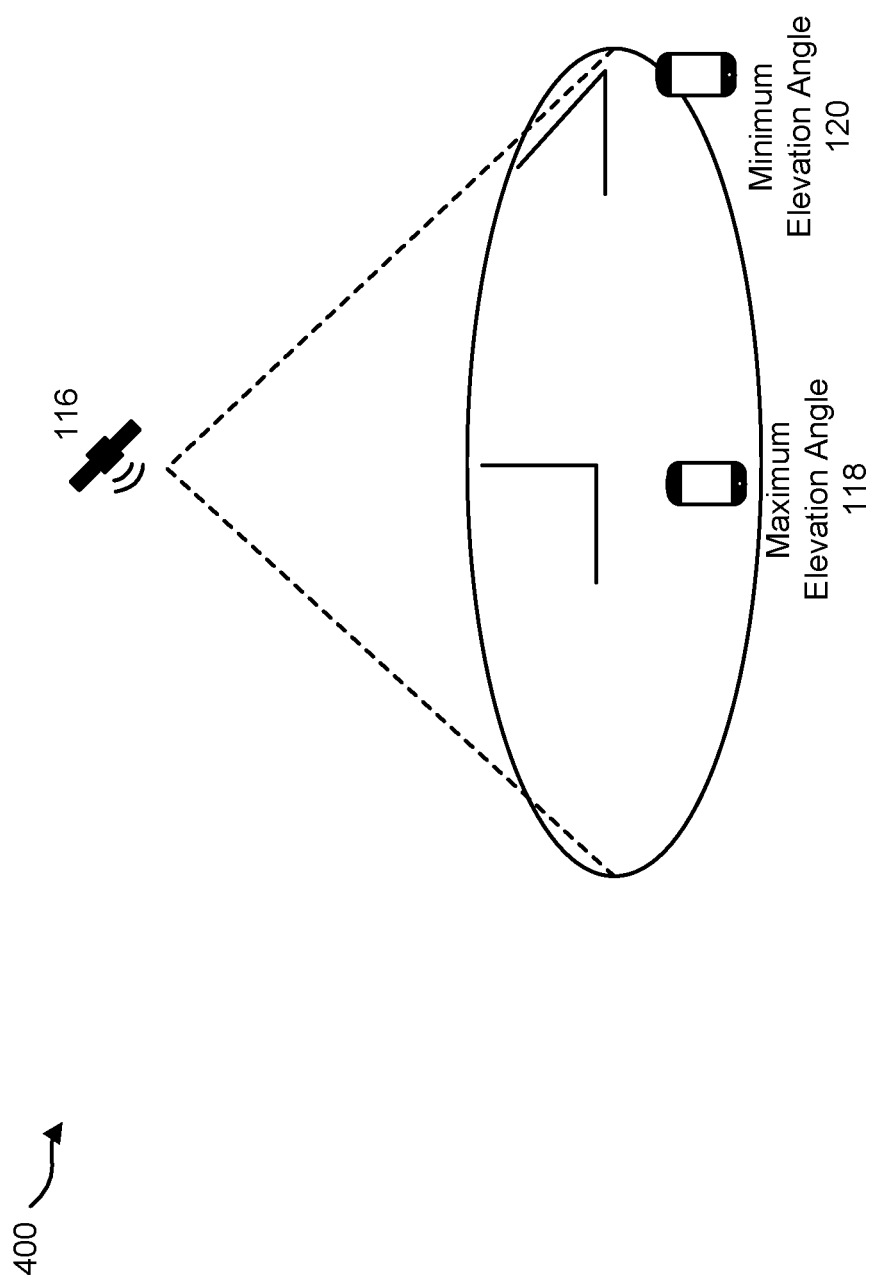
FIG. 4 is a diagram illustrating satellite elevation angle variations with respect to location of wireless terminals.

A method to reduce serving cell measurement may include evaluation of additional parameters including elevation angle. The wireless terminal may:
1) Calculate elevation angle slope or the ratio of change in elevation angles with respect to time using current and previous elevation angles
2) Determine measurement triggers by evaluating slope values.
3) Calculate trend of elevation angle to determine measurement triggers FIG. 4 is a diagram 400 illustrating satellite elevation angle variations with respect to location of wireless terminal. Elevation angle (118, 120) is the angle between the ground level and the line pointing to the satellite 116 from the wireless terminal. The maximum value for elevation angle 118 is 90°, indicating that the satellite is directly overhead. The maximum elevation angle 118 is also the shortest distance between satellite 116 and wireless terminal. The received power level is strongest at the maximum elevation angle 118. The minimum elevation angle 120 between 5°-15° provides the lowest received power level to the wireless terminal. Elevation angle (118, 120) may be calculated using known formulas and requires satellite ephemeris data along with wireless terminal location information.

Figure 5:
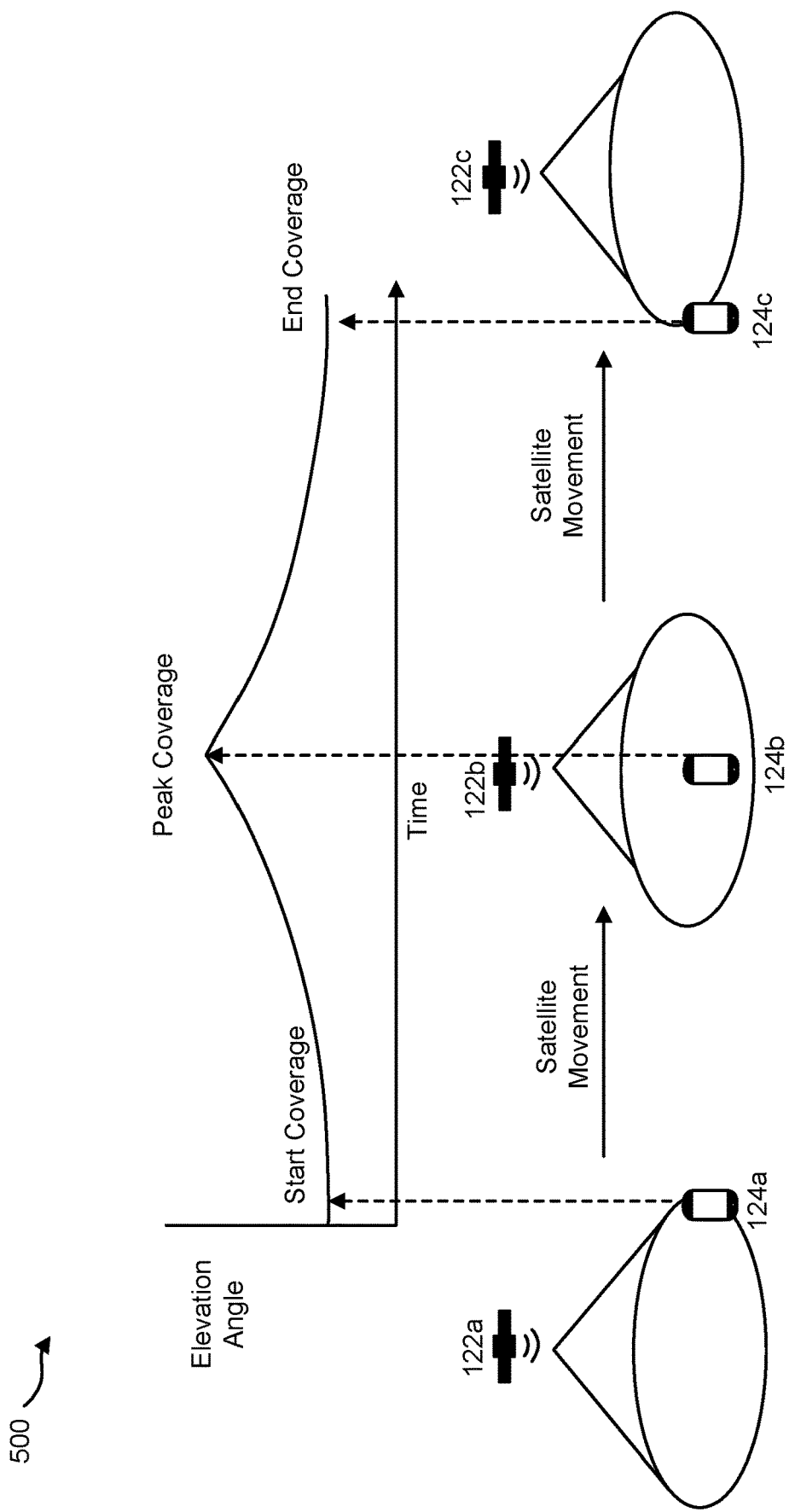
FIG. 5 is a diagram illustrating the coverage of wireless terminals in communication with satellites.

FIG. 5 is a diagram 500 illustrating the coverage of a wireless terminal in communication with a satellite over a period of time. At time t1, the satellite 122a and the wireless terminal 124a are in the positions as shown. At time t2, the satellite 122b and the wireless terminal 124b are in the positions as shown. At time t3, the satellite 122c and the wireless terminal 124c are in the positions as shown. FIG. 5 depicts the relationship between elevation angle and corresponding coverage states from FIG. 1. As the elevation angle increases, the coverage improves until peak coverage time. Once peak coverage occurs, the elevation angle decreases until the satellite (122a, 122b, 122c) moves away from the wireless terminal (124a, 124b, 124c).

Figure 6:
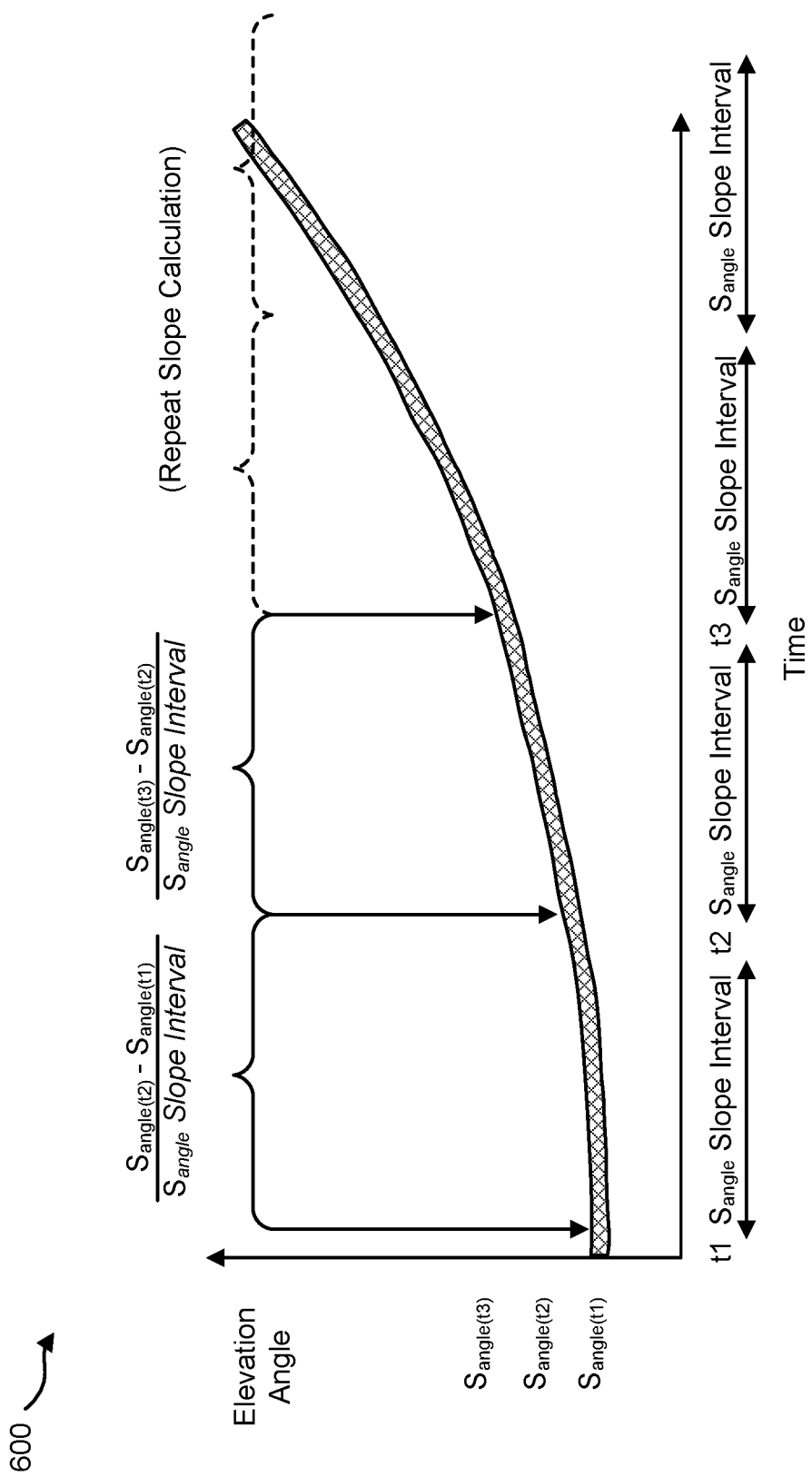
FIG. 6 is a graph illustrating elevation angles.

In this embodiment, additional parameters or information elements are introduced by the network and broadcasted to the wireless terminal:
a. $S_{angle}$ Slope Interval—a time interval between $S_{angle}$ slope calculations
b. $S_{angle}$ Threshold—a threshold slope value to determine start of cell reselection evaluation process FIG. 6 is a graph 600 illustrating how elevation angle changes between start of satellite coverage and the peak coverage. In this example, at t1, the wireless terminal may calculate elevation angle ($S_{angle(t1)}$). At t2, (t1+$S_{angle}$ Slope Interval), the elevation angle may be calculated ($S_{angle(t2)}$). For slope calculation, the difference between current ($S_{angle(t2)}$ and previous $S_{angle(t1)}$) is divided by $S_{angle}$ Slope Interval. The next slope value at t3 is calculated using $S_{angle(t3)}$ as current and $S_{angle(t2)}$ as previous elevation angles. A positive elevation angle slope may indicate that receive power is increasing. At the beginning of satellite coverage, the $S_{rxlevel}$ may be lower than the cell reselection threshold values ($S_{IntraSearchP}/S_{NonIntraSearchP}$) transmitted by the network. As a result, the cell reselection evaluation process may be triggered even though coverage may improve. To prevent excess cell reselections, the wireless terminal may evaluate the trend of the calculated slope values. If the slope continues to be positive, then the wireless terminal may choose not to perform cell reselection evaluation process.

Figure 7:
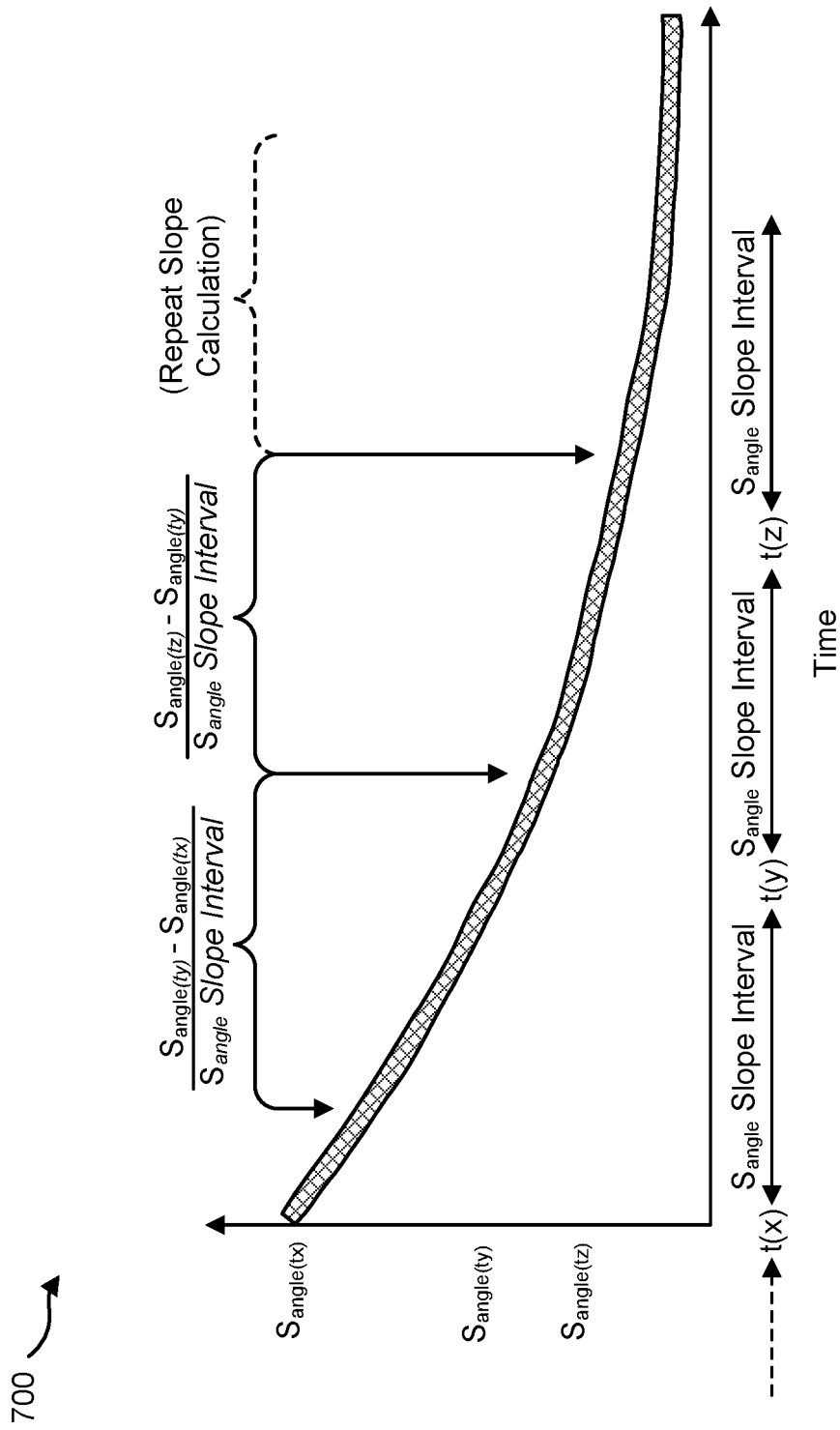
FIG. 7 is a graph illustrating elevation angles.

FIG. 7 is a graph 700 illustrating the elevation angle values between peak coverage and end of coverage. The wireless terminal may calculate $S_{angle}$ every $S_{angle}$ Interval and computes differences between current and previous $S_{angle}$. In this example, when the $S_{angle}$ Interval expired at t(y), the difference between $S_{angle}$ at t(y) and $S_{angle}$ at t(x) is computed. The difference is compared with $S_{angle}$ Threshold. The process may continue for every $S_{angle}$ Interval until the result of the difference is lower than the $S_{angle}$ Threshold. Then the wireless terminal may choose to perform cell reselection evaluation process.

Figure 8:
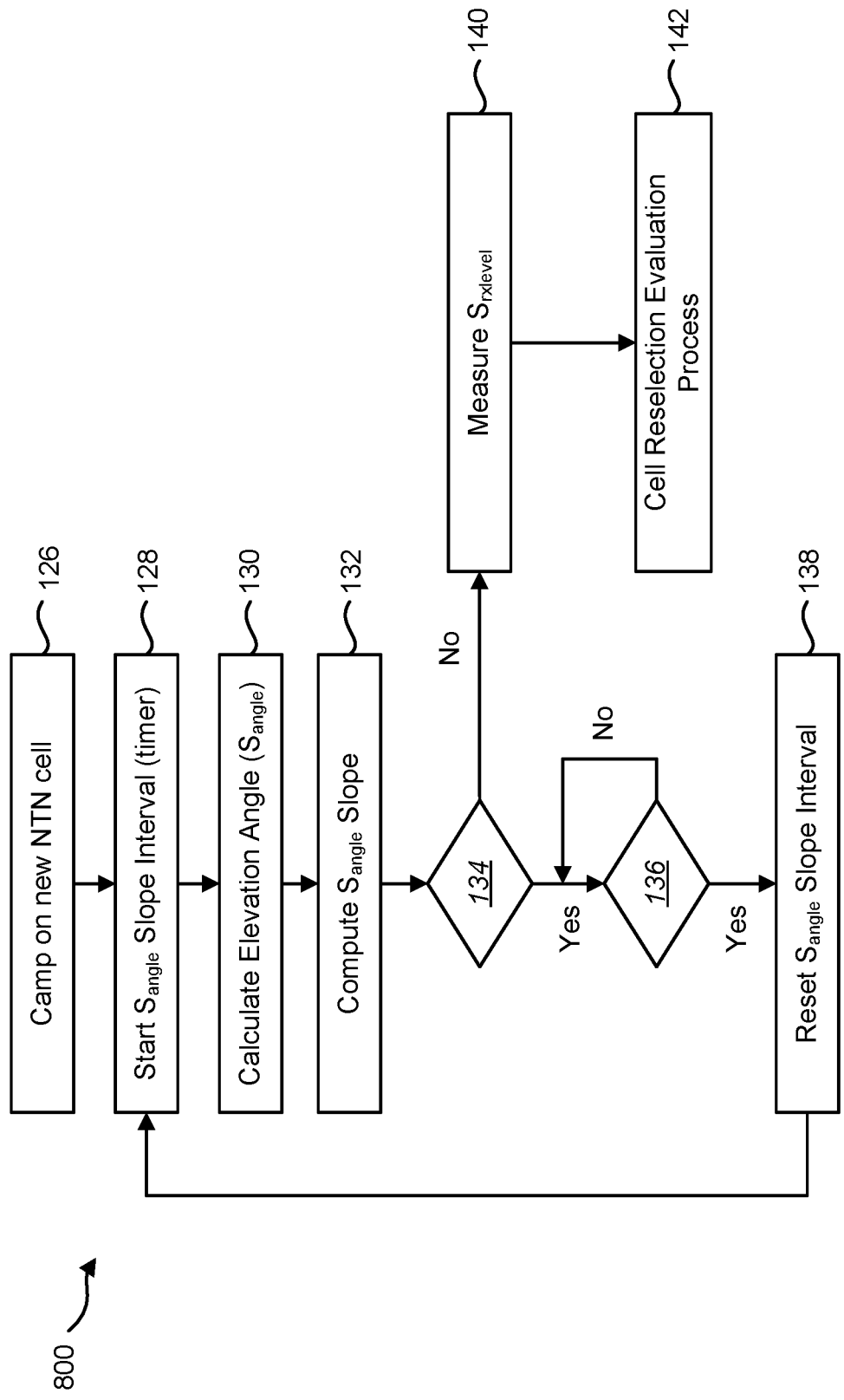
FIG. 8 is a flow diagram depicting steps performed by a wireless terminal camped on an NTN cell.

FIG. 8 is a flow diagram 800 that depicts representative steps or acts performed by a wireless terminal once it is camped 126 on to an NTN cell. The wireless terminal may start 128 $S_{angle}$ Slope Interval (timer). The wireless terminal may then calculate 130 elevation angle ($S_{angle}$). The current $S_{angle}$ Slope value may be computed 132 using the formulas described in FIGS. 6 and 7. Then wireless terminal may then compare 134 $S_{angle}$ Slope with the $S_{angle}$ Slope Threshold value broadcasted by the network (SIB 32). If the $S_{angle}$ Slope value is less than the $S_{angle}$ Slope Threshold value, then the wireless terminal measures 140 serving cell received power level and cell reselection evaluation process 142 may begin since the satellite coverage may continue to move away from the wireless terminal. If $S_{angle}$ Slope value is greater than or equal to $S_{angle}$ Slope Threshold, the wireless terminal may determine 136 if the $S_{angle}$ Slope Interval expired. The wireless terminal may then reset 138 the $S_{angle}$ Slope Interval and return to start 182 $S_{angle}$ Slope Interval (timer).

Figure 9:
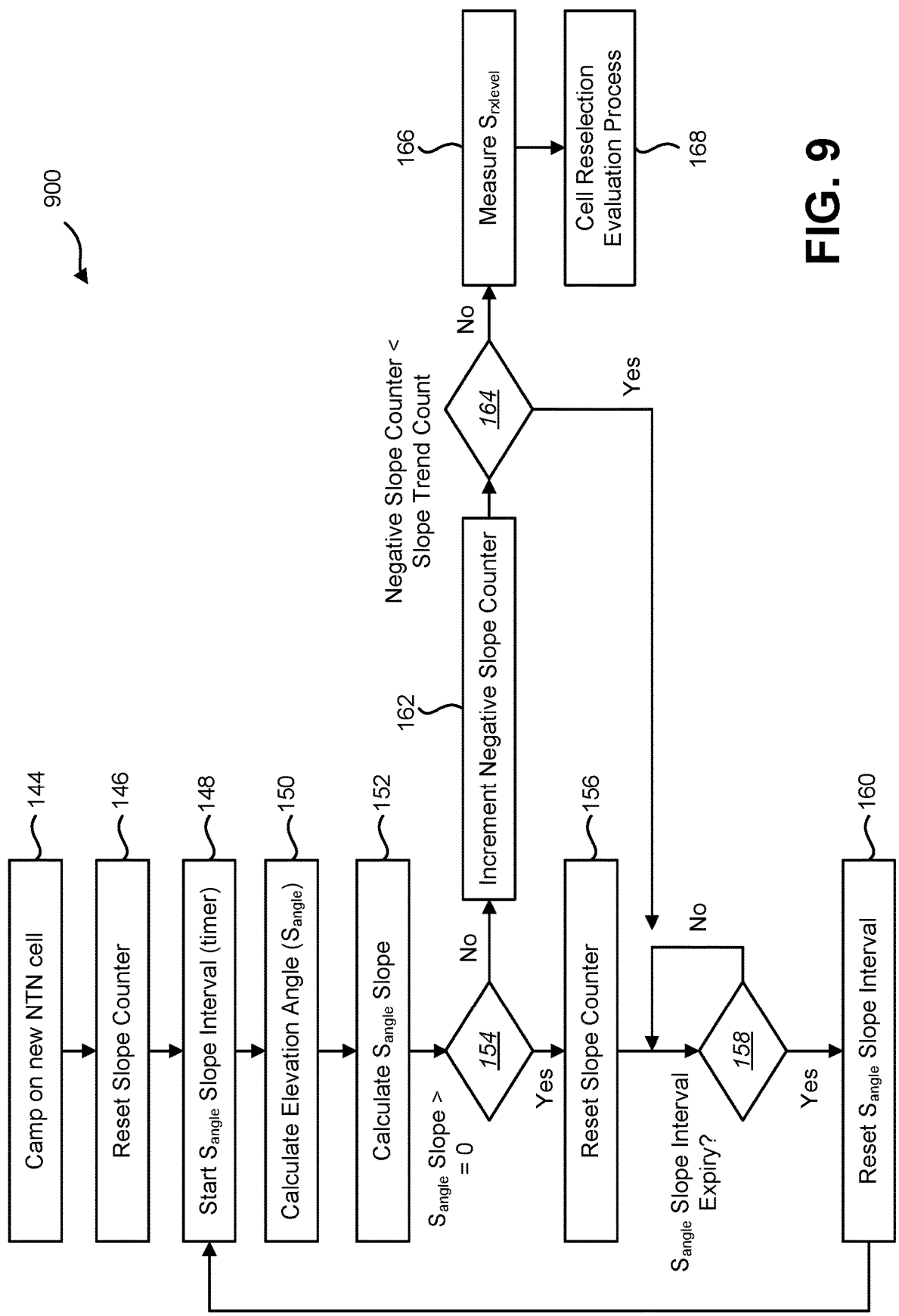
FIG. 9 is a flow diagram depicting steps performed by a wireless terminal camped on a new NTN cell.

Alternatively, as depicted in flow diagram 900 FIG. 9, the wireless terminal may compare previous $S_{angle}$ Slope values to determine trend of $S_{angle}$ values. The wireless terminal camps 144 on a new cell. The wireless terminal may be comprised of a negative slope counter that is reset 146 to 0. The wireless terminal may then start 148 $S_{angle}$ Slope Interval (timer). The wireless terminal may then calculate 150 elevation angle ($S_{angle}$). The wireless terminal may then calculate 152 $S_{angle}$ Slope. The wireless terminal may determine 154 whether the calculated $S_{angle}$ Slope value is greater than or equal to 0. If the calculated $S_{angle}$ Slope value is greater than or equal to 0, the negative slope counter is reset 156. The wireless terminal may determine 158 if the $S_{angle}$ Slope Interval expired. Once timer is expired, the wireless device may reset 160 $S_{angle}$ Slope Interval to start 148 the next slope calculation. If the calculated $S_{angle}$ Slope value is negative, the negative slope counter is incremented 162. The negative slope counter is compared 164 with $S_{angle}$ Trend Count. $S_{angle}$ Trend Count may be defined by the network and is the consecutive number of times elevation angle slopes downward, which may indicate that the satellite may transition to out of coverage. The wireless terminal may then measure 166 the $S_{rxlevel}$. The $S_{rxlevel}$ may be used 168 for cell reselection evaluation process.

If no suitable cell is discovered during the cell reselection evaluation process as defined in 36.304, the wireless terminal may proceed to use DRX or a different timer defined in 36.133 for serving cell measurement interval.

The value of $S_{angle}$ Slope Interval and $S_{angle}$ Slope Threshold may depend on type of satellite (LEO, MEO), beam path/orbit and elevation from earth. A satellite with a large beam path (>1000 km2), may have a longer coverage time than a satellite with lower beam path (<100 km2). As a result, the $S_{angle}$ Slope Timer and $S_{angle}$ Slope Threshold may be adjusted accordingly by the network. The network or gNB may transmit the $S_{angle}$ Slope Timer and/or $S_{angle}$ Slope Threshold to the wireless terminal using RRC signaling messages. The wireless terminal may receive these parameters and use them to calculate slope values.

```
-- ASN1START
SystemInformationBlockType32-r17 :: = SEQUENCE {
    satelliteInfoList-r17              SatelliteInfoList-r17
        OPTIONAL,   -- Need OR
nonCriticalExtension                    SEQUENCE { }
    OPTIONAL,
    ...
}
SatelliteInfoList-r17 ::= SEQUENCE (SIZE (1..maxSat-r17))
    OF SatelliteInfo-r17}
SatelliteInfo-r17 ::= SEQUENCE {
    satelliteSAI-r17                    CHOICE {
    sgp4EphemerisParameters-r17
        SGP4EphemerisParameters-r17
    earthFixedCellParameters-r17
        EarthFixedCellParameters-r17
    nonCriticalExtension                SEQUENCE { }
    }
    satelliteID-r17                     INTEGER (0..255)
        OPTIONAL,
    satelliteFootprintParameters-r17
        SatelliteFootprintParameters-r17            OPTIONAL,
    nonCriticalExtension                SEQUENCE { }
        OPTIONAL,
}
    EarthFixedCellParameters-r17 ::= SEQUENCE {
    t-ServiceStart-r17                  SEQUENCE ( SIZE (1..10))
        OF INTEGER (0..1048575)
    nonCriticalExtension                SEQUENCE { }
}
SGP4EphemerisParameters-r17 ::= SEQUENCE {
    inclination-r17                     INTEGER (0..2097151)
    periapsis-r17                       INTEGER (0..2097151)
    longitude-r17                       INTEGER (0..4194303)
    anomaly-r17                         INTEGER (0..4194303)
    eccentricity-r17                    INTEGER (0..16777215)
    meanMotion-r17                      INTEGER (0..17179869183)
    revNoEpoch-r17                      INTEGER (0..131071)
    bStar-r17                           BIT STRING (23)
    epochStar-r17                       INTEGER (-1048575..1048575)
}
SatelliteFootprintParameters-r17 ::= SEQUENCE {
    elevationAngleR-r17                 INTEGER (-7..7)
        OPTIONAL,
    elevationAngleL-r17                 INTEGER (-7..7)
        OPTIONAL,
    refPointX-r17                       INTEGER (X1..X2)
        OPTIONAL,
    refPointY-r17                       INTEGER (Y1..-Y2)
        OPTIONAL,
    refRadius-r17                       INTEGER (1..200)
        OPTIONAL,
    nonCriticalExtension                SEQUENCE { }
        OPTIONAL,
}
SatelliteElevationAngleParameters-r17 ::= SEQUENCE {
    elevationAngleInterval              INTEGER (1..7200)
        OPTIONAL,
    elevationAngleSlopeThreshold        INTEGER (-10000..0)
        OPTIONAL,
    elevationAngleNegativeCount                     INTEGER (2..100)
        OPTIONAL,
    nonCriticalExtension                SEQUENCE { }
        OPTIONAL,
}
-- ASN1STOP
```

Listing 1

Listing 1 is an example implementation of elevationAngleInterval ($S_{angle}$ Slope Interval), elevationAngleSlopeThreshold ($S_{angle}$ Slope Threshold) and elevationAngleNegativeCount ($S_{angle}$ Trend Count) that are comprised in System Information Block Type 32 (SIB 32). The network or gNB may transmit the $S_{angle}$ Slope Timer, $S_{angle}$ Slope Threshold and $S_{angle}$ Trend Count to the wireless terminal using RRC signaling messages. The wireless terminal may receive these parameters and use them to calculate slope values.

Figure 10:
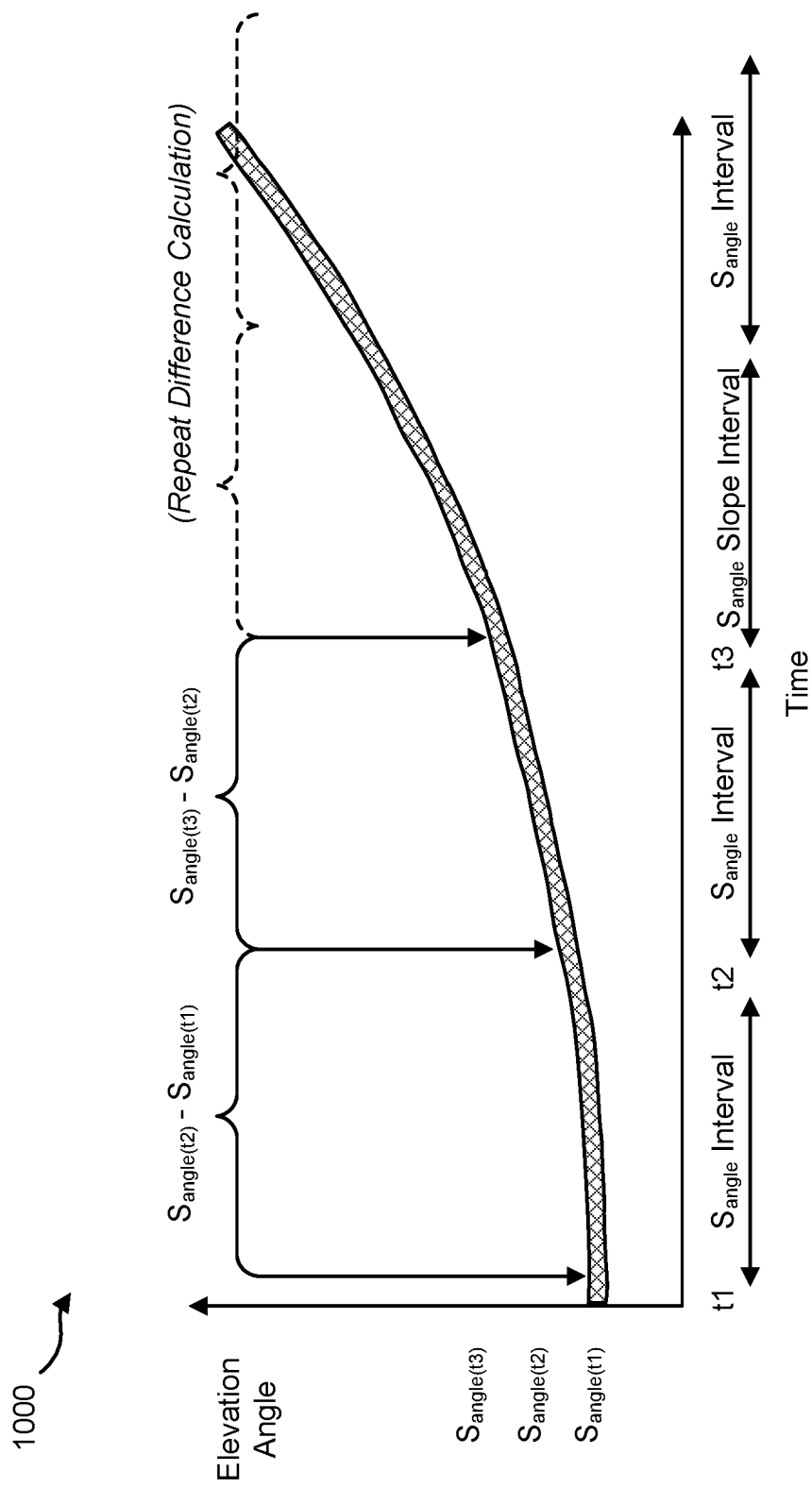
FIG. 10 is a graph illustrating elevation angles.

FIG. 10 is a graph 1000 illustrating elevation angles. The network may decide that the elevation angle slope time interval may remain constant. In this case, the network may not transmit a rrcConnectionReconfiguration message with a modified $S_{angle}$ Slope value. If the $S_{angle}$ Slope Interval will not change for each satellite, the slope calculation, as described previously may not be necessary. As an alternative, new parameters are introduced:$S_{angle}$ Interval and $S_{angle}$ Threshold. FIG. 10 depicts the elevation angle changes from start of coverage to peak coverage. The wireless terminal may calculate the elevation angle at time t(1). After the expiry of $S_{angle}$ Interval at time t(2), the wireless terminal may calculate elevation angle, $S_{angle(t2)}$. The wireless terminal may compute the difference between current elevation angle ($S_{angle(t2)}$), and previous elevation angle ($S_{angle}$(t1)). If the result is greater than $S_{angle}$ Threshold, the wireless terminal may choose not to perform cell reselection evaluation. The wireless terminal may calculate the elevation angle after the expiry of $S_{angle}$ Interval at t3. The difference between current $S_{angle}$ (t3) and previous $S_{angle}$ (t2) will be compared with the $S_{angle}$ Threshold value. The process of calculating angle elevation and comparing the result with the threshold after each expiry of $S_{angle}$ Interval may continue until the wireless terminal camps on a new cell or the satellite coverage ceases.

Figure 11:
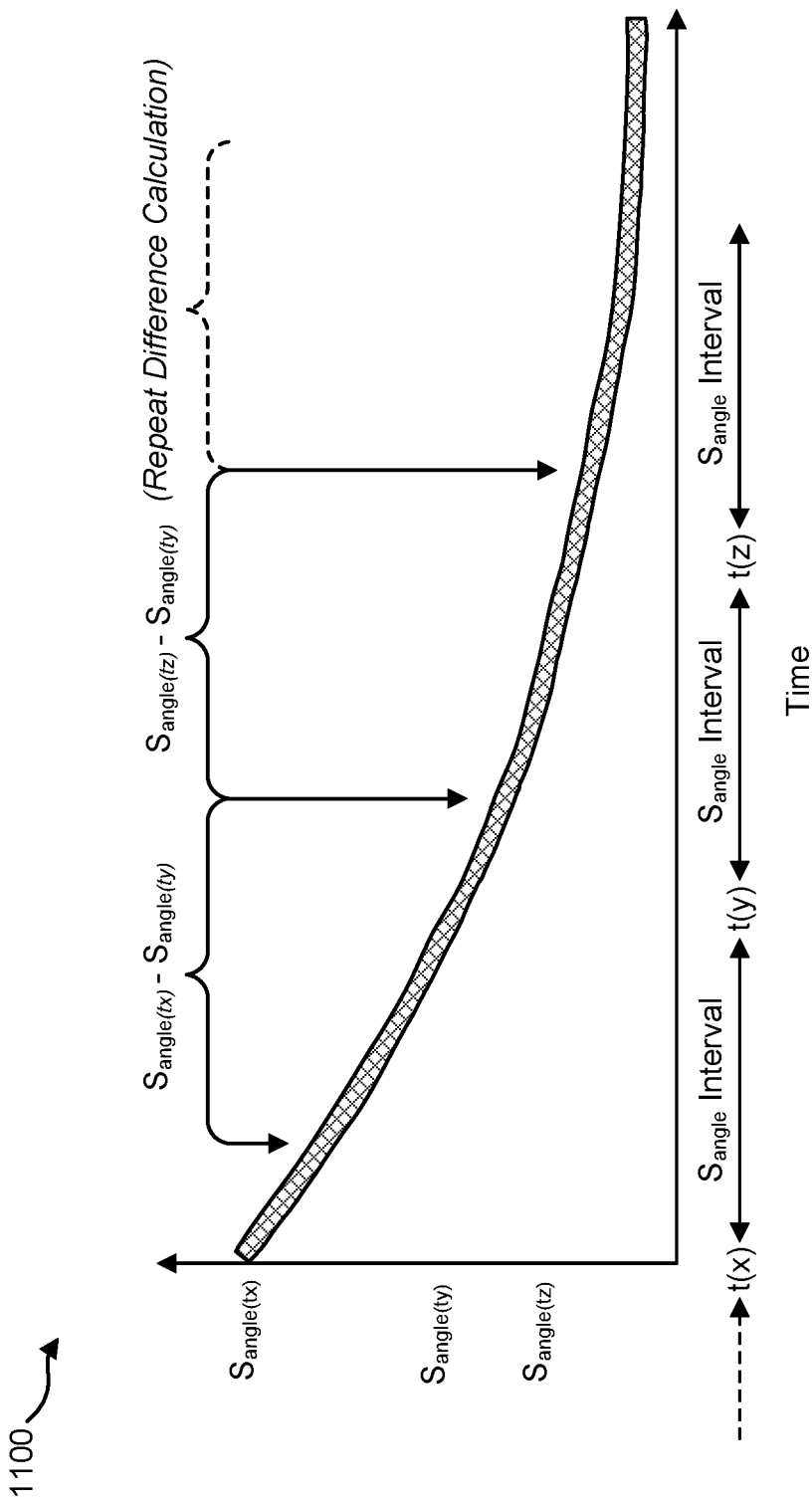
FIG. 11 is a graph illustrating elevation angles.

FIG. 11 is a graph 1100 that depicts the elevation angle values between peak coverage and end of coverage similar. The wireless terminal may calculate $S_{angle}$ every $S_{angle}$ Interval and computes differences between current and previous $S_{angle}$. In this example, the $S_{angle}$ Interval expired at t(x). $S_{angle}$ may be calculated by the wireless terminal and the difference is compared with $S_{angle}$ Threshold. The process may continue for every $S_{angle}$ Interval until the result of the difference is lower than the $S_{angle}$ Threshold. The wireless terminal may choose to perform cell reselection evaluation process if the difference is less than the $S_{angle}$ Threshold.

Figure 12:
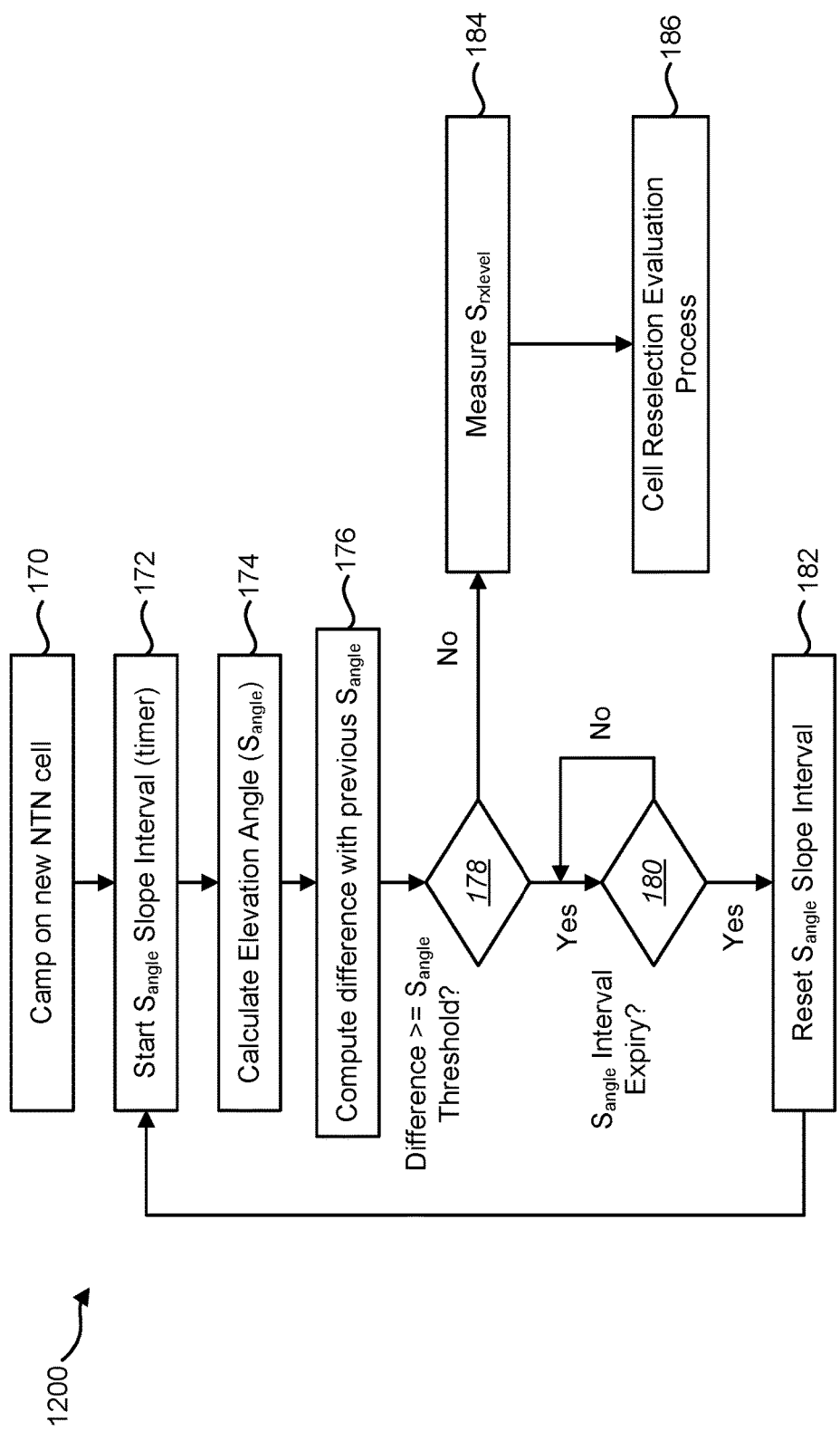
FIG. 12 is a flow diagram depicting steps performed by a wireless terminal camped on a new NTN satellite cell.

FIG. 12 is a flow diagram 1200 that depicts representative steps or acts performed by a wireless terminal to reduce cell reselections while connected to a satellite network. Once a wireless terminal is camped 170 on a new NTN satellite cell, the $S_{angle}$ Interval, a timer, starts 172. The wireless terminal may then calculate 174 elevation angle. The wireless terminal may compute 176 the difference between the current elevation angle and previous elevation angle (Current $S_{angle}$–Previous $S_{angle}$). If it is determined 178 that the difference is less than the $S_{angle}$ Threshold, the satellite coverage may enter discontinuous service or period of no coverage. As a result, wireless terminal may measure 184 serving cell received power and start 186 cell reselection evaluation procedure.

If it is determined 178 that the elevation angle difference is greater than or equal to the $S_{angle}$ Threshold, the wireless terminal may choose not to perform cell reselection evaluation process. The wireless terminal may determine 180 whether the $S_{angle}$ Interval timer has expired. If the $S_{angle}$ Interval timer has expired, the $S_{angle}$ Interval timer may reset 182 and the process will restart.

```
-- ASN1START
SystemInformationBlockType32-r17 ::= SEQUENCE {
    satelliteInfoList-r17        SatelliteInfoList-r17
        OPTIONAL,  -- Need OR
    nonCriticalExtension         SEQUENCE { }
        OPTIONAL,
    ...
}
SatelliteInfoList-r17 ::= SEQUENCE (SIZE (1..maxSat-r17))
    OF SatelliteInfo-r17}
SatelliteInfo-r17 ::= SEQUENCE {
    satelliteSAI-r17             CHOICE {
    sgp4EphemerisParameters-r17
        SGP4EphemerisParameters-r17
    earthFixedCellParameters-r17
        EarthFixedCellParameters-r17
    nonCriticalExtension         SEQUENCE { }
    }
    satelliteID-r17              INTEGER (0..255)
        OPTIONAL,
    satelliteFootprintParameters-r17
        SatelliteFootprintParameters-r17    OPTIONAL,
    nonCriticalExtension         SEQUENCE { }
        OPTIONAL,
}
    EarthFixedCellParameters-r17 :: = SEQUENCE {
    t-ServiceStart-r17           SEQUENCE( SIZE (1..10))
OF INTEGER (0..1048575)
    nonCriticalExtension         SEQUENCE { }
}
SGP4EphemerisParameters-r17 ::= SEQUENCE {
    inclination-r17              INTEGER (0..2097151)
    periapsis-r17                INTEGER (0..2097151)
    longitude-r17                INTEGER (0..4194303)
    anomaly-r17                  INTEGER (0..4194303)
    eccentricity-r17             INTEGER (0..16777215)
    meanMotion-r17               INTEGER (0..17179869183)
    revNoEpoch-r17               INTEGER (0..131071)
    bStar-r17                    BIT STRING (23)
    epochStar-r17                INTEGER (-1048575..1048575)
}
SatelliteFootprintParameters-r17 ::= SEQUENCE {
    elevationAngleR-r17          INTEGER (-7..7)
        OPTIONAL,
    elevationAngleL-r17          INTEGER (-7..7)
        OPTIONAL,
    refPointX-r17                INTEGER (X1..X2)
        OPTIONAL,
    refPointY-r17                INTEGER (Y1..-Y2)
        OPTIONAL,
    refRadius-r17                INTEGER (1..200)
        OPTIONAL,
    nonCriticalExtension         SEQUENCE { }
        OPTIONAL,
}
    SatelliteElevationAngleParameters-r17 ::= SEQUENCE
    elevationAngleInterval       INTEGER (1..7200)
        OPTIONAL,
    elevationAngleThreshold      INTEGER (-15..0)
        OPTIONAL,
    nonCriticalExtension         SEQUENCE { }
        OPTIONAL,
}
-- ASN1STOP
```

Listing 2

Listing 2 is an example implementation of elevationAngleInterval ($S_{angle}$ Interval) and elevationAngleThreshold ($S_{angle}$ Threshold) that are comprised in System Information Block Type 32 (SIB 32).

If the serving cell fulfils Srxlev>$S_{IntraSearchP}$, the wireless terminal may choose not to perform intra-frequency measurements.

Else if the elevation angle slope is greater than elevation angle slope threshold or elevation angle trends positive, the wireless terminal may choose not to perform intra-frequency measurements Otherwise, the wireless terminal shall perform intra-frequency measurements.

The wireless terminal shall apply the following rules for NB-IoT inter-frequencies which are indicated in system information:

If the serving cell fulfils Srxlev>$S_{nonIntraSearchP}$, the wireless terminal may choose not to perform inter-frequency measurements.

Else if the elevation angle slope is greater than elevation angle slope threshold or elevation angle trends positive, the wireless terminal may choose not to perform inter-frequency measurements Otherwise, the wireless terminal shall perform inter-frequency measurements.

If the wireless terminal supports relaxed monitoring and s-SearchDeltaP is present in SystemInformationBlockType3-NB, the wireless terminal may further limit the needed measurements, as specified in clause 5.2.4.12.

Listing 3

Listing 3 is an example procedure of cell reselection measurement rules.

Embodiment 2

Figure 13:
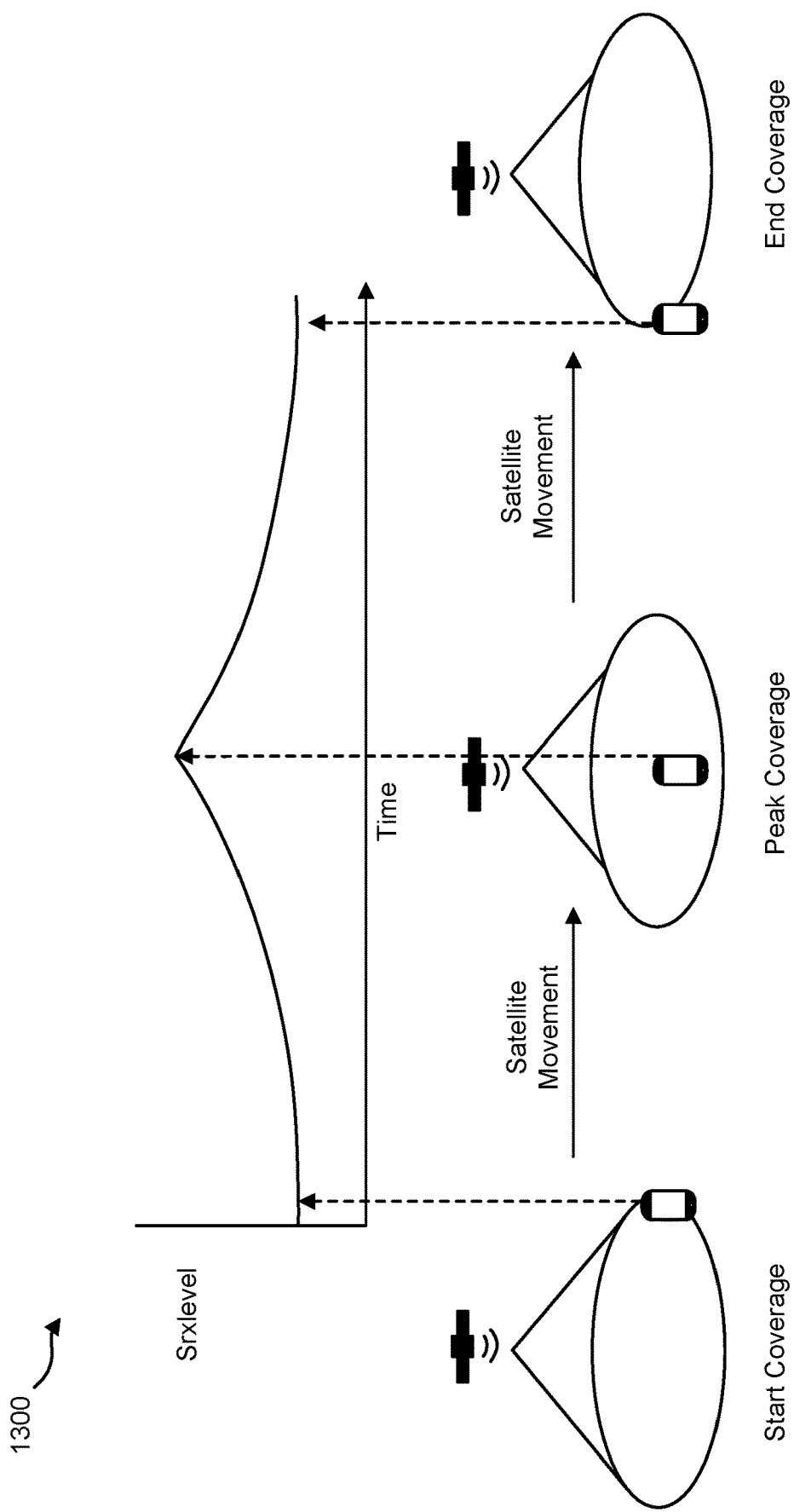
FIG. 13 is a diagram illustrating satellite movement and the corresponding received power levels.

FIG. 13 depicts satellite movement 1300 from FIG. 1 and the corresponding received power levels ($S_{rxlevel}$). As the satellite moves toward the wireless terminal, coverage starts and the $S_{rxlevel}$ is low. The same satellite continues to move and the $S_{rxlevel}$ may also increase until the orbit path is closest to the wireless device. This may also be referred as peak coverage and the $S_{rxlevel}$ is at the highest. Then the $S_{xlevel}$ may decrease as the satellite moves away from the wireless terminal until end of coverage.

Another method that may reduce excessive cell reselections performed by wireless terminal is comprised of wireless terminal that calculates slope values of serving cell received power measurements. The wireless terminal may compare calculated slope values with a threshold value broadcasted by network. As depicted in FIG. 13, the values of $S_{rxlevel}$ may vary depending on the location of the satellite with respect to the wireless terminal. The slope may be calculated by using the same methods as the elevation angle slope values described in FIG. 6 and FIG. 7.

Figure 14:
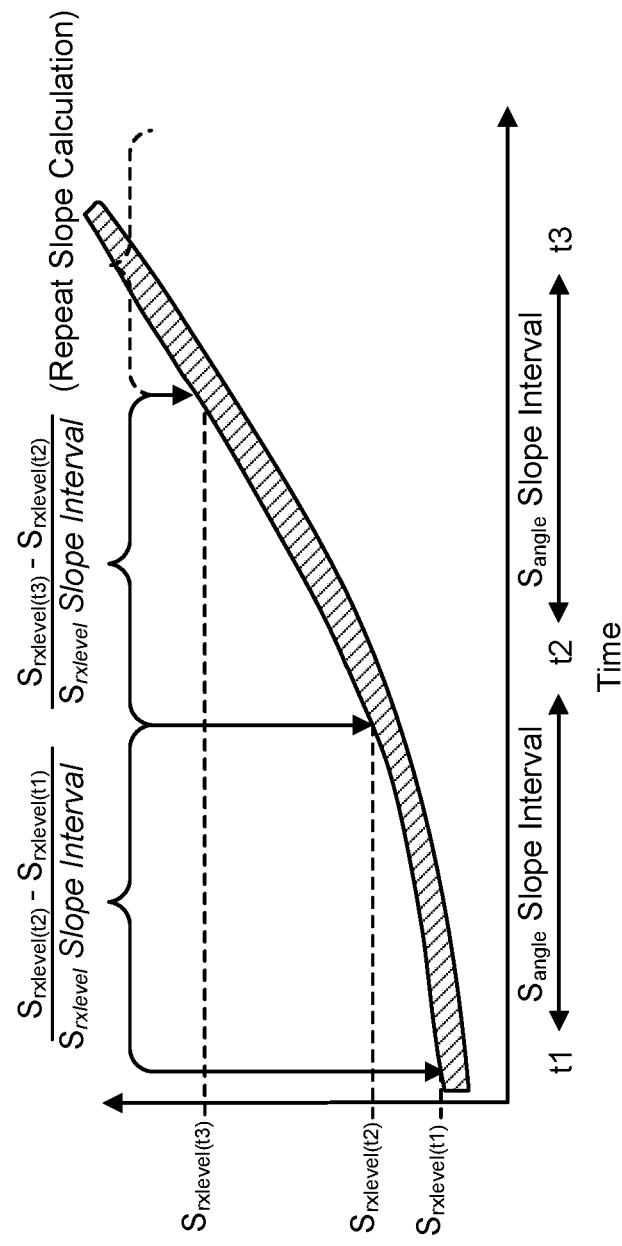
FIG. 14 is a graph illustrating changes between the starting satellite coverage and the peak coverage.

FIG. 14 is a graph 1400 that depicts the $S_{rxlevel}$ changes between start of satellite coverage and the peak coverage. In this example, at t1, the wireless terminal may measure ($S_{rxlevel\ (t1)}$). At t2, (t1+$S_{rxlevel}$ Slope Interval), the serving cell received power may be measured ($S_{rxlevel\ (t2)}$). For slope calculation, the difference between current ($S_{rxlevel\ (t2)}$ and previous $S_{rxlevel\ (t1)}$ is divided by $S_{rxlevel}$ Slope Interval. The next slope value at t3 is calculated using $S_{rxlevel\ (t3)}$ as current and $S_{rxlevel\ (t2)}$ as previous $S_{rxlevel}$. A positive slope may indicate that receive power is increasing. At the beginning of satellite coverage, the $S_{rxlevel}$ may be lower than the cell reselection threshold values ($S_{IntraSearchP}/S_{NonIntraSearchP}$) transmitted by the network. As a result, the cell reselection evaluation process may be triggered even though coverage may improve. To prevent excess cell reselections, the wireless terminal may evaluate the calculated slope values. If the slope continues to be positive, then the wireless terminal may choose not to perform cell reselection evaluation process.

Figure 15:
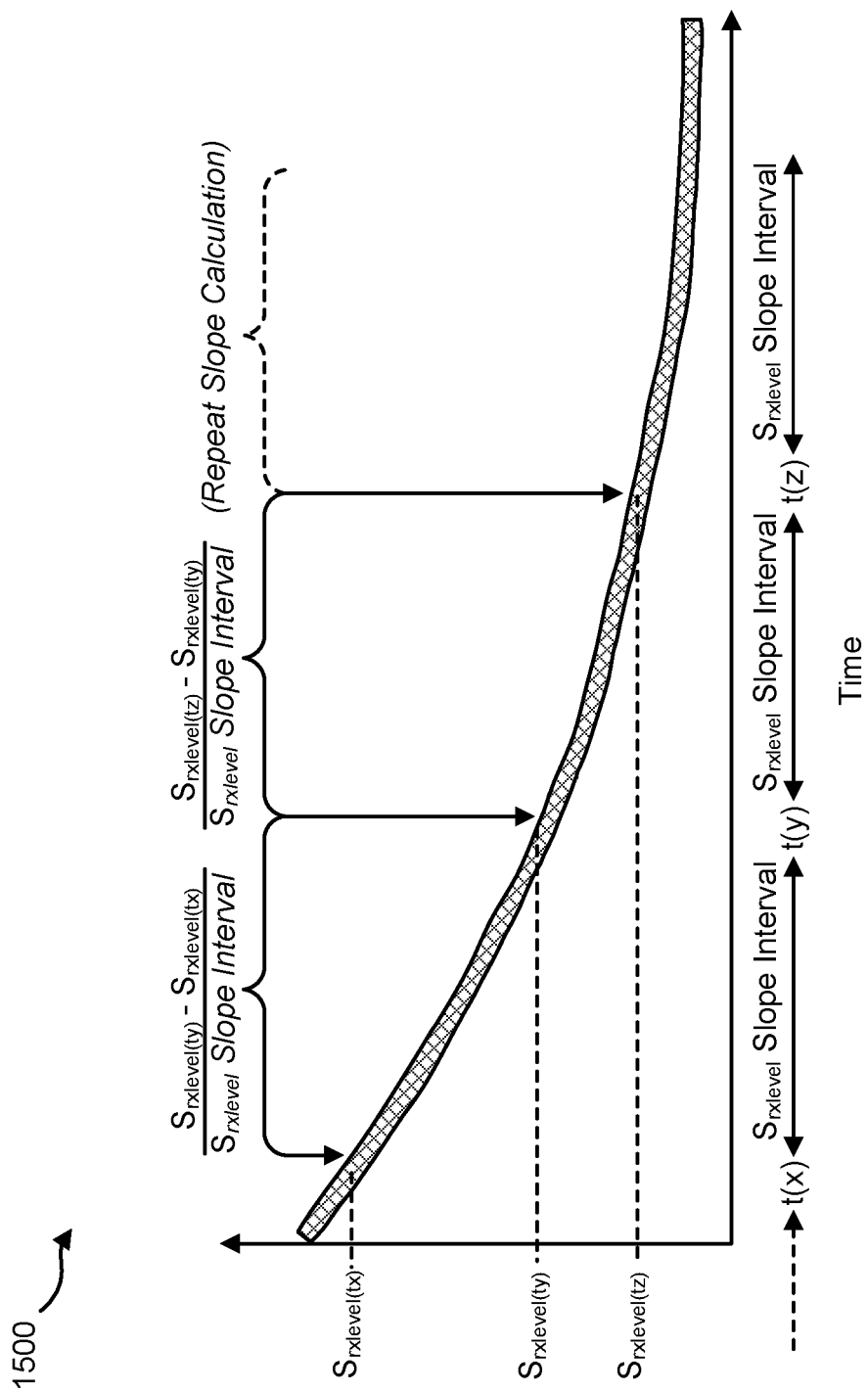
FIG. 15 is a graph illustrating changes between the peak coverage and the end coverage.

FIG. 15 is a graph 1500 that depicts the $S_{rxlevel}$ changes between time of peak coverage and end of coverage. As the satellite continues to move away from the wireless terminal, calculated slope values may switch to a negative value, indicating a continuous drop in $S_{rxlevel}$. If elevation angle slope trends negative or the slope is less than the elevation angle slope threshold, the wireless terminal may start cell reselection evaluation process by comparing $S_{rxlevel}$ with the (intra/inter frequency) $S_{rxlevel}$ thresholds. The wireless terminal may also revert to measuring serving cell received power every DRX cycle or as defined in 36.133.

Figure 16:
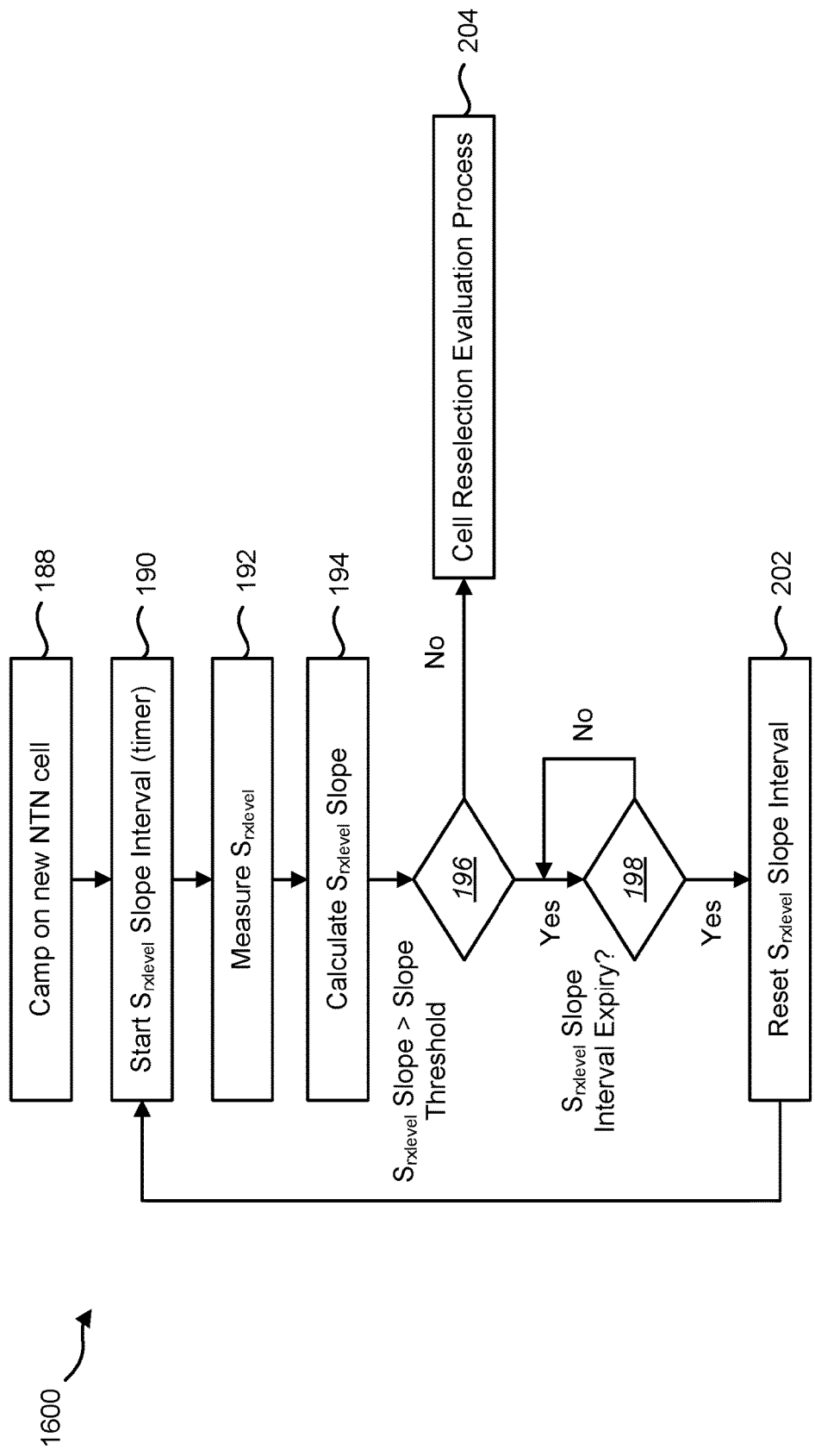
FIG. 16 is a flow diagram depicting steps performed by a wireless terminal to reduce cell reselections.

FIG. 16 is a flow diagram 1600 that depicts representative steps or acts performed by a wireless terminal to reduce cell reselections. The wireless terminal camps 188 on a new cell. The $S_{rxlevel}$ Slope Interval timer may then start 190. The wireless terminal may measure 192 serving cell received power level ($S_{rxlevel}$). $S_{rxlevel}$ Slope is then calculated 194. It is then determined 196 whether the calculated slope value is greater than $S_{rxlevel}$ Slope Threshold. If the calculated slope value is not greater than than $S_{rxlevel}$ Slope Threshold, the wireless terminal may choose to perform 204 cell reselection evaluation process using the measured $S_{rxlevel}$. If $S_{rxlevel}$ Slope is greater than the $S_{rxlevel}$ Threshold value, the wireless terminal may choose not to perform cell reselection evaluation. The wireless terminal then checks 198 for expiry of $S_{rxlevel}$ Slope Interval timer. Once the timer expires, the $S_{rxlevel}$ Slope Interval is reset 202 and the process to start 190 $S_{rxlevel}$ Slope Interval timer may repeat.

If cell reselection evaluation 204 occurs, the wireless terminal may choose to use DRX cycle for subsequent reselection evaluations.

Figure 17:
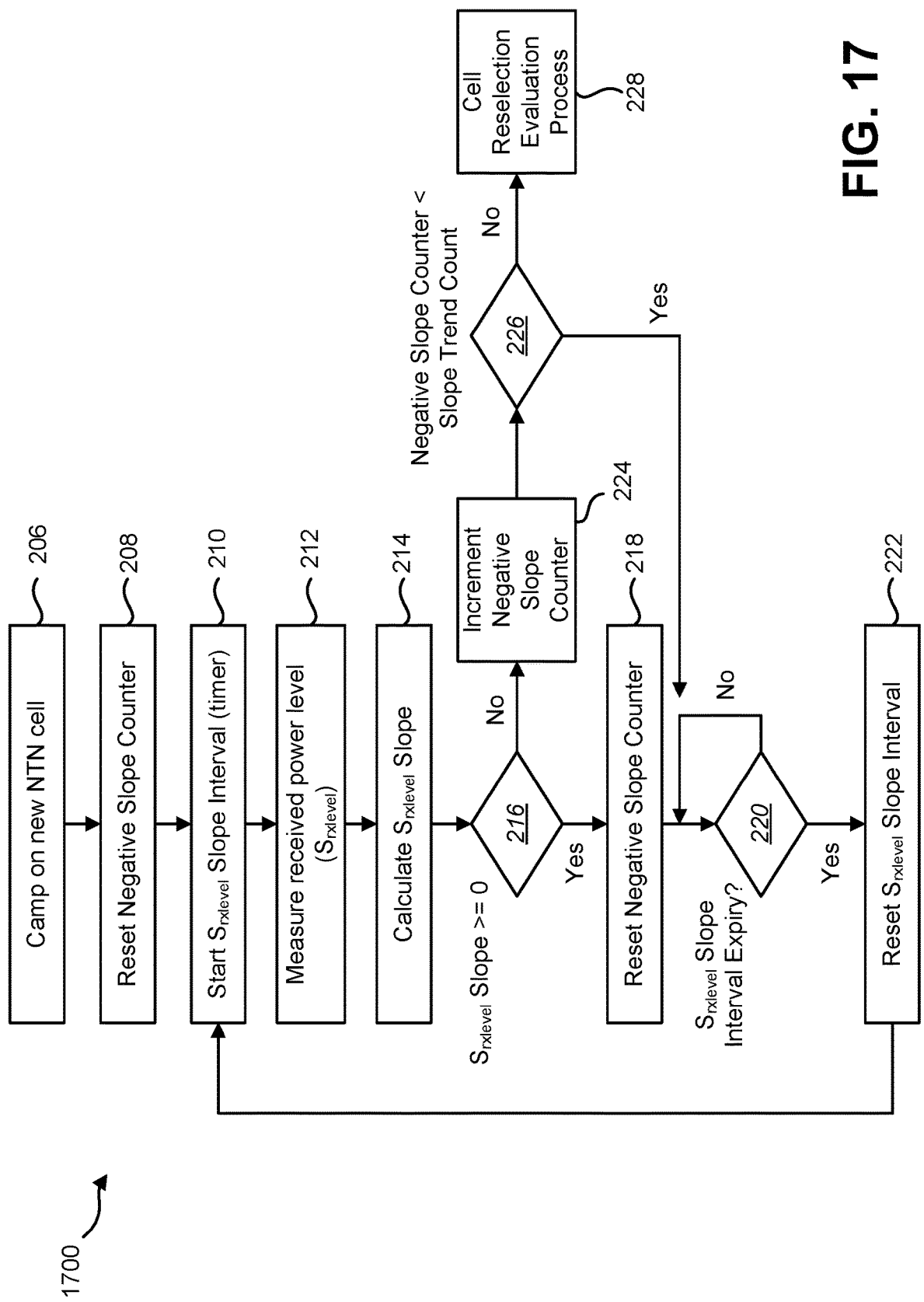
FIG. 17 is a flow diagram depicting steps performed by a wireless terminal to determine the trend of $S_{rxlevel}$ values.

Alternatively, as depicted in flow diagram 1700 of FIG. 17, the wireless terminal may compare previous $S_{rxlevel}$ Slope values to determine trend of $S_{rxlevel}$ values. The wireless terminal camps 206 on a new cell. The wireless terminal may then reset 208 a negative slope counter to 0. The $S_{rxlevel}$ Slope Interval timer may then start 210. The wireless terminal may measure 212 serving cell received power level ($S_{rxlevel}$). $S_{rxlevel}$ Slope is then calculated 214. It is then determined 216 whether the calculated $S_{rxlevel}$ Slope value is greater than or equal to 0. If the calculated $S_{rxlevel}$ Slope value is greater than or equal to 0, the negative slope counter is reset 218. It is then determined 220 whether the $S_{rxlevel}$ Slope Interval has expired. Once timer expires, the wireless device may reset 222 $S_{rxlevel}$ Slope Interval to start 210 the next slope calculation. If the calculated $S_{rxlevel}$ Slope value is negative, the negative slope counter is incremented 224. The negative slope counter is compared 226 with $S_{rxlevel}$ Trend Count. $S_{rxlevel}$ Trend Count may be defined by the network and is the consecutive number of times elevation angle slopes downward, which may indicate that the satellite may transition to out of coverage. The $S_{rxlevel}$ may be used for cell reselection evaluation process 228.

If no suitable cell is discovered during the cell reselection evaluation process as defined in 36.304, the wireless terminal may proceed to cell selection process and use DRX or a different timer defined in 36.133 for serving cell measurement interval.

The value of $S_{rxlevel}$ Slope Interval and $S_{rxlevel}$ Slope Threshold may depend on type of satellite (LEO, MEO), beam path/orbit and elevation from earth. A satellite with a large beam path (>1000 km2), may have a longer coverage time than a satellite with lower beam path (<100 km2). As a result, the $S_{angle}$ Slope Timer and $S_{angle}$ Slope Threshold may be adjusted accordingly by the network.

```
-- ASN1START
SystemInformationBlockType32-r17 ::= SEQUENCE {
    satelliteInfoList-r17         SatelliteInfoList-r17
        OPTIONAL,   -- Need OR
    nonCriticalExtension          SEQUENCE { }
        OPTIONAL,
    ...
}
SatelliteInfoList-r17 ::= SEQUENCE (SIZE (1..maxSat-r17))
    OF SatelliteInfo-r17}
SatelliteInfo-r17 ::= SEQUENCE {
    satelliteSAI-r17              CHOICE {
    sgp4EphemerisParameters-r17
        SGP4EphemerisParameters-r17
    earthFixedCellParameters-r17
        EarthFixedCellParameters-r17
    nonCriticalExtension          SEQUENCE { }
    }
    satelliteID-r17               INTEGER (0..255)
        OPTIONAL,
    satelliteFootprintParameters-r17
        SatelliteFootprintParameters-r17    OPTIONAL,
    nonCriticalExtension          SEQUENCE { }
        OPTIONAL,
}
EarthFixedCellParameters-r17 ::= SEQUENCE {
    t-ServiceStart-r17            SEQUENCE( SIZE (1..10))
    OF INTEGER (0..1048575)
    nonCriticalExtension          SEQUENCE { }
}
SGP4EphemerisParameters-r17 ::= SEQUENCE {
    inclination-r17               INTEGER (0..2097151)
    periapsis-r17                 INTEGER (0..2097151)
    longitude-r17                 INTEGER (0..4194303)
    anomaly-r17                   INTEGER (0..4194303)
    eccentricity-r17              INTEGER (0..16777215)
    meanMotion-r17                INTEGER (0..17179869183)
    revNoEpoch-r17                INTEGER (0..131071)
    bStar-r17                     BIT STRING (23)
    epochStar-r17                 INTEGER (-1048575..1048575)
}
SatelliteFootprintParameters-r17 ::= SEQUENCE {
    elevationAngleR-r17           INTEGER (-7..7)
        OPTIONAL,
    elevationAngleL-r17           INTEGER (-7..7)
        OPTIONAL,
    refPointX-r17                 INTEGER (X1..X2)
        OPTIONAL,
    refPointY-r17                 INTEGER (Y1..-Y2)
        OPTIONAL,
    refRadius-r17                 INTEGER (1..200)
        OPTIONAL,
    nonCriticalExtension          SEQUENCE { }
        OPTIONAL,
}
SatelliteElevationAngleParameters-r17 ::= SEQUENCE {
    rxlevelInterval               INTEGER (1..7200)
        OPTIONAL,
```

```
    rxlevelSlopeThreshold          INTEGER (-10000..0)
      OPTIONAL,
    rxlevelNegativeCount            INTEGER (2..100)
      OPTIONAL,
    nonCriticalExtension            SEQUENCE { }
      OPTIONAL,
  }
  -- ASN1STOP
```

Listing 4

Listing 4 is an example implementation of rxlevelInterval ($S_{rxlevel}$ Interval) and rxlevelSlopeThreshold ($S_{rxlevel}$ Slope Threshold) that are comprised in System Information Block Type 32 (SIB 32). The network or gNB may transmit the $S_{rxlevel}$ Slope Timer, $S_{rxlevel}$ Slope Threshold to the wireless terminal using RRC signaling messages. The wireless terminal may receive these parameters and use them to calculate slope values.

As stated in previous embodiment and depicted in FIGS. 10, 11, and 12, the network may decide that the time interval to calculate slope values may remain constant. If the $S_{rxlevel}$ Slope Interval will not change for each satellite, the slope calculation may not necessary. and the wireless terminal may calculate the difference between received power level measurements against a threshold value.

Figure 18:
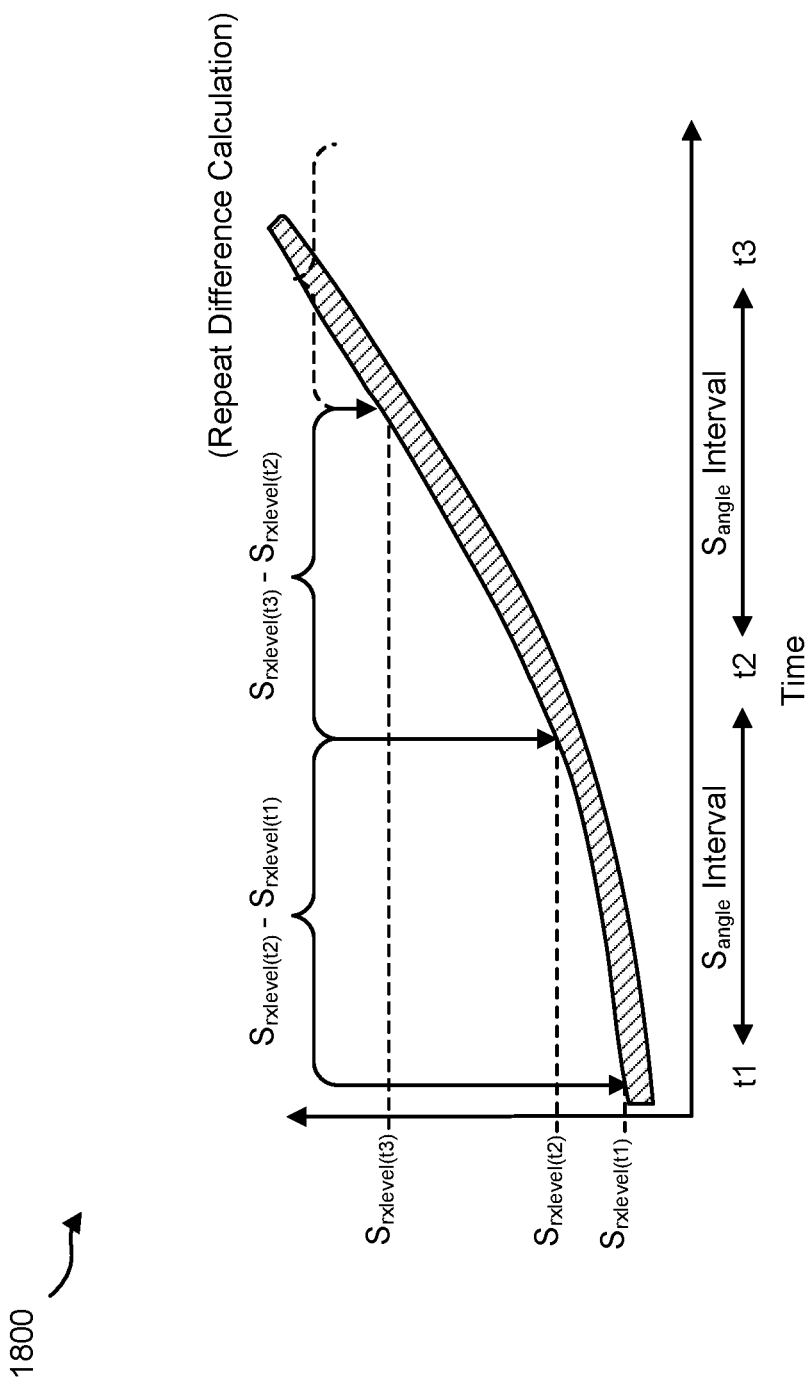
FIG. 18 is a graph illustrating changes between the start coverage and the peak coverage.

FIG. 18 is a graph 1800 illustrating changes between the start coverage and the peak coverage. The network may decide that the elevation angle slope time interval may remain constant. In this case, the network may not transmit a rrcConnectionReconfiguration message with a modified $S_{rxlevel}$ Slope value. If the $S_{rxlevel}$ Slope Interval will not change for each satellite, the slope calculation, as described previously in FIGS. 14 and 15, may not be necessary. As an alternative, new parameters are introduced: $S_{rxlevel}$ Interval and $S_{rxlevel}$ Threshold. FIG. 18 depicts the received power level changes from start of coverage to peak coverage. The wireless terminal may measure the serving cell received power level at time t(1). After the expiry of $S_{rxlevel}$ Interval at time t(2), the wireless terminal may measure received power level, $S_{rxlevel}$ (t2). The wireless terminal may compute the difference between current received power level ($S_{xlevel}$ (t2)), and previous received power level ($S_{rxlevel}$ (t1)). If the result is greater than $S_{rxlevel}$ Threshold, the wireless terminal may choose not to perform cell reselection evaluation. The wireless terminal may repeat the process of calculating $S_{rxlevel}$ difference after the expiry of $S_{rxlevel}$ Interval until the wireless terminal camps on a new cell or the satellite coverage ceases.

Figure 19:
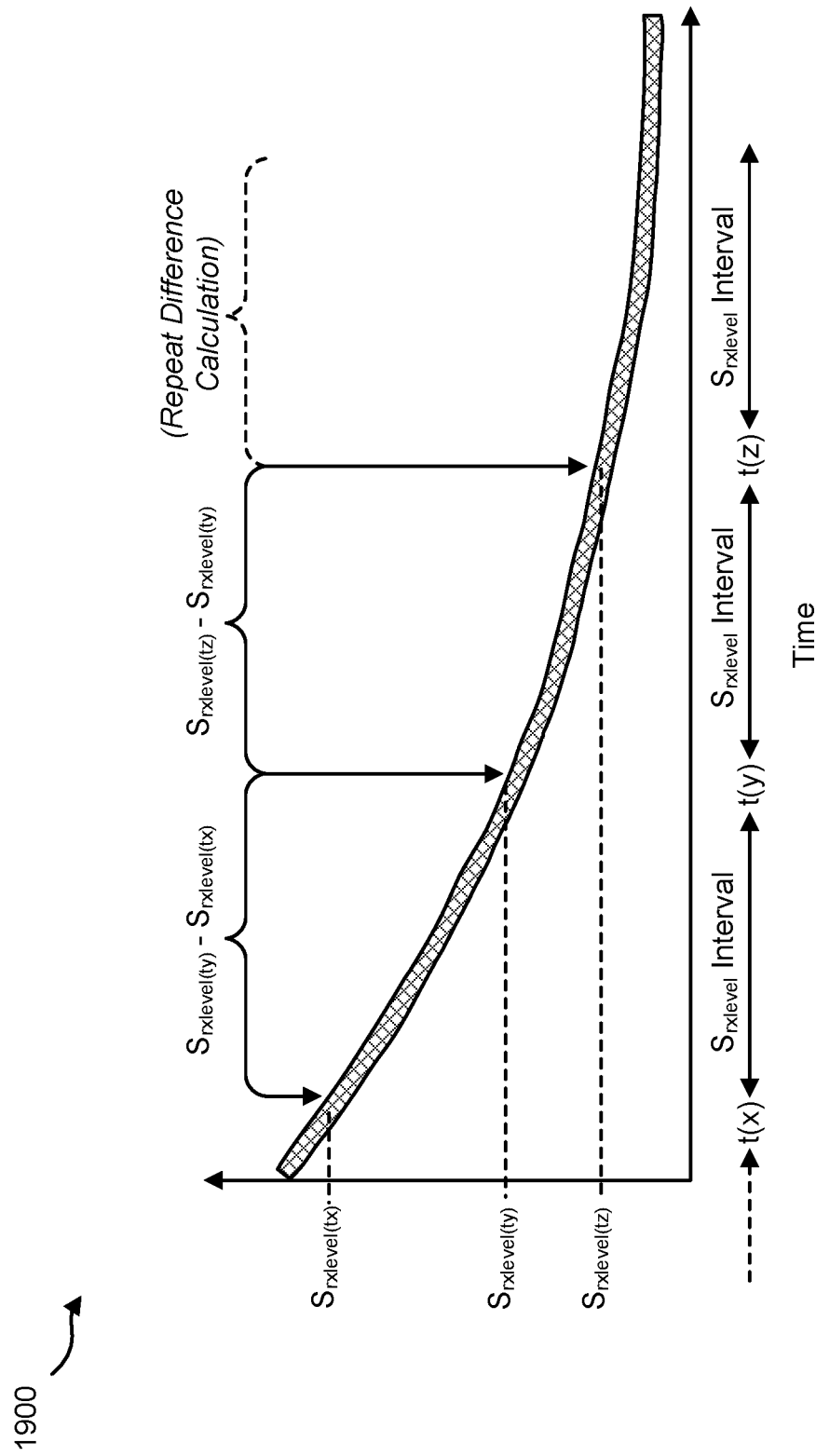
FIG. 19 is a graph illustrating the power level between the peak coverage and the end coverage.

FIG. 19 is a graph 1900 depicting the received power level between peak coverage and end of coverage. The wireless terminal may measure received power level every $S_{rxlevel}$ Interval and computes differences between current and previous $S_{rxlevel}$. In this example, the $S_{rxlevel}$ Interval expired at t(x). The difference is compared with $S_{xlevel}$ Threshold. The wireless terminal may choose to perform cell reselection evaluation process if the difference is less than the $S_{rxlevel}$ Threshold. The process may continue for every $S_{rxlevel}$ Interval until the result of the difference is lower than the $S_{xlevel}$ Threshold or the satellite coverage disappears.

Figure 20:
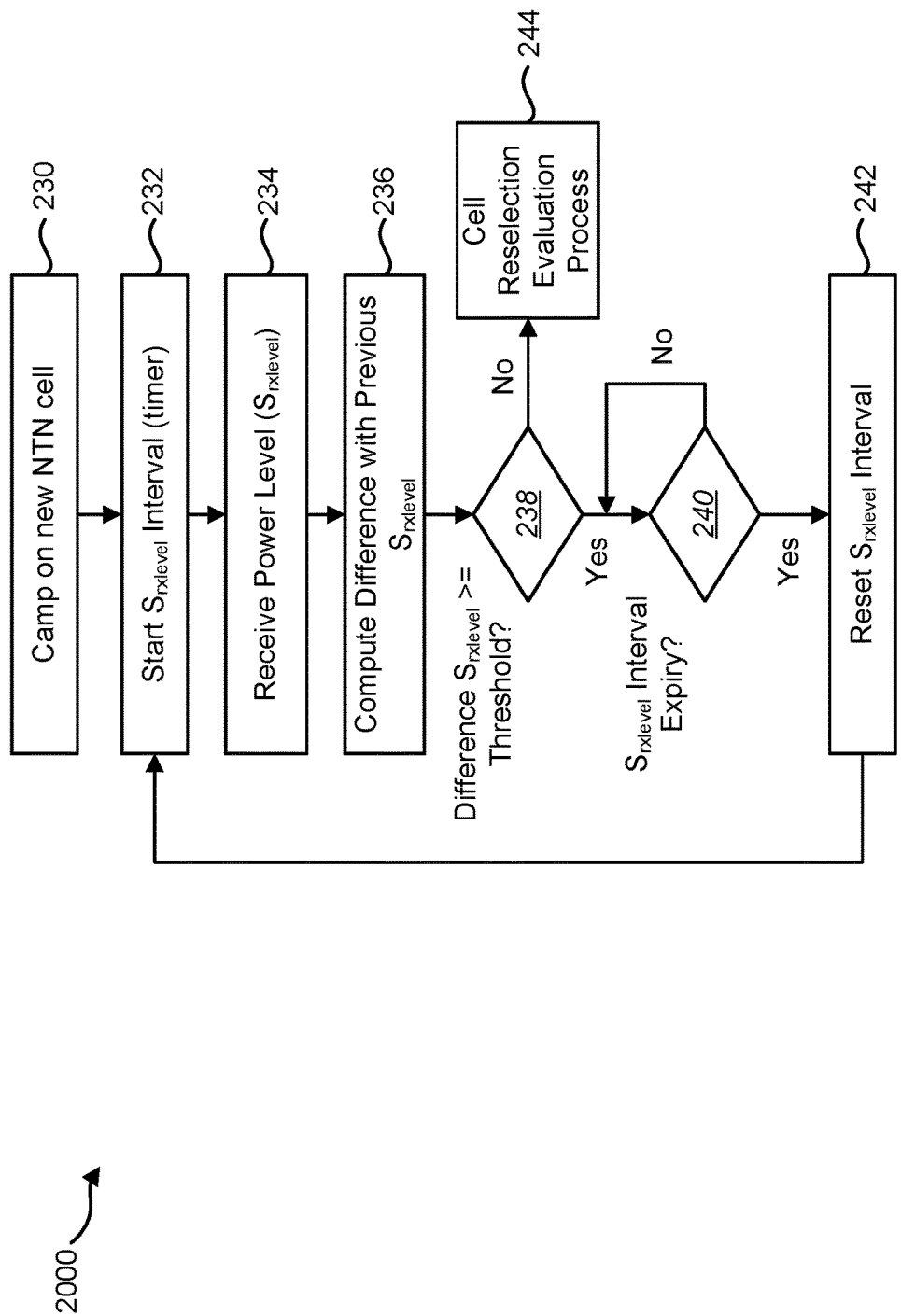
FIG. 20 is a flow diagram depicting steps performed by a wireless terminal to reduce cell reselections while connected to a satellite network.

FIG. 20 is a flow diagram 2000 that depicts representative steps or acts performed by a wireless terminal to reduce cell reselections while connected to a satellite network. Once a wireless terminal is camped 230 on a new NTN satellite cell, the $S_{rxlevel}$ Interval, a timer, starts 232. The wireless terminal may then measure 234 received power level. The wireless terminal may then compute 236 the difference between the current $S_{rxlevel}$ and previous $S_{rxlevel}$. If it is determined 238 that the difference is less than the $S_{xlevel}$ Threshold, the satellite coverage may enter discontinuous service or period of no coverage. As a result, wireless terminal may start 244 cell reselection evaluation procedure using the measured $S_{rxlevel}$.

If it is determined 238 that the $S_{rxlevel}$ difference is greater than or equal to the $S_{rxlevel}$ Threshold, the wireless terminal may choose not to perform cell reselection evaluation process. It may then be determined 240 whether the $S_{rxlevel}$ Interval timer has expired. If the $S_{rxlevel}$ Interval timer has expired, the $S_{angle}$ Interval timer may reset 242 to 0 and the process will restart 232.

```
-- ASN1START
SystemInformationBlockType32-r17 ::= SEQUENCE {
    satelliteInfoList-r17           SatelliteInfoList-r17
      OPTIONAL,  -- Need OR
    nonCriticalExtension            SEQUENCE { }
      OPTIONAL,
    ...
}
SatelliteInfoList-r17 ::= SEQUENCE (SIZE (1..maxSat-r17)) OF
SatelliteInfo-r17}
SatelliteInfo-r17 ::= SEQUENCE {
    satelliteSAI-r17                CHOICE {
    sgp4EphemerisParameters-r17     SGP4EphemerisParameters-r17
    earthFixedCellParameters-r17
      EarthFixedCellParameters-r17
    nonCriticalExtension            SEQUENCE { }
    }
    satelliteID-r17                 INTEGER (0..255)
      OPTIONAL,
    satelliteFootprintParameters-r17
      SatelliteFootprintParameters-r17        OPTIONAL,
    nonCriticalExtension            SEQUENCE { }
      OPTIONAL,
}
EarthFixedCellParameters-r17 ::= SEQUENCE {
    t-ServiceStart-r17              SEQUENCE( SIZE (1..10))
OF INTEGER (0..1048575)
    nonCriticalExtension            SEQUENCE { }
}
SGP4EphemerisParameters-r17 ::= SEQUENCE {
    inclination-r17                 INTEGER (0..2097151)
    periapsis-r17                   INTEGER (0..2097151)
    longitude-r17                   INTEGER (0..4194303)
    anomaly-r17                     INTEGER (0..4194303)
    eccentricity-r17                INTEGER (0..16777215)
    meanMotion-r17                  INTEGER (0..17179869183)
    revNoEpoch-r17                  INTEGER (0..131071)
    bStar-r17                       BIT STRING (23)
    epochStar-r17                   INTEGER (-1048575..1048575)
}
SatelliteFootprintParameters-r17 ::= SEQUENCE {
    elevationAngleR-r17             INTEGER (-7..7)
      OPTIONAL,
    elevationAngleL-r17             INTEGER (-7..7)
      OPTIONAL,
    refPointX-r17                   INTEGER (X1..X2)
      OPTIONAL,
    refPointY-r17                   INTEGER (Y1..-Y2)
      OPTIONAL,
    refRadius-r17                   INTEGER (1..200)
      OPTIONAL,
    nonCriticalExtension            SEQUENCE { }
      OPTIONAL,
}
SatelliteRxLevelParameters-r17 ::= SEQUENCE {
    rxlevelInterval                 INTEGER (1..7200)
      OPTIONAL,
    rxlevelThreshold                INTEGER (-10000..0)
      OPTIONAL,
```

| | |
|---|---|
| nonCriticalExtension OPTIONAL, | SEQUENCE { } |
| } | |
| -- ASN1STOP | |

Listing 5

Listing 5 is an example implementation of rxlevelInterval ($S_{xlevel}$ Interval) and rxlevelThreshold ($S_{rxlevel}$ Threshold) that are comprised in System Information Block Type 32 (SIB 32).

If the serving cell fulfils Srxlev>$S_{IntraSearchP}$, the wireless terminal may choose not to perform intra-frequency measurements.

Else if the $S_{rxlevel}$ Slope is greater than $S_{rxlevel}$ Slope threshold or $S_{rxlevel}$ trends positive, the wireless terminal may choose not to perform intra-frequency measurements Otherwise, the wireless terminal shall perform intra-frequency measurements.

The wireless terminal shall apply the following rules for NB-IoT inter-frequencies which are indicated in system information:

If the serving cell fulfils Srxlev>$S_{nonIntraSearchP}$, the wireless terminal may choose not to perform inter-frequency measurements.

Else if the $S_{rxlevel}$ Slope is greater than $S_{rxlevel}$ Slope threshold or Srxlevel trends positive, the wireless terminal may choose not to perform inter-frequency measurements Otherwise, the wireless terminal shall perform inter-frequency measurements.

If the wireless terminal supports relaxed monitoring and s-SearchDeltaP is present in SystemInformationBlockType3-NB, the wireless terminal may further limit the needed measurements, as specified in clause 5.2.4.12.

Listing 6

Listing 6 is an example procedure of cell reselection measurement rules.

In another embodiment, if multiple NTN neighbor cells exists, the wireless terminal may use the same slope, trend, or difference calculations to determine best suited cell for reselection. Once the wireless terminal enters (FIG. 16 step 204, FIG. 17, step 228, FIG. 20, step 244) cell reselection evaluation process, the wireless terminal may perform $S_{rxlevel}$ measurements of the NTN neighbor cells and calculate for each cell, slope, trend, or difference. The best suited cell may be determined by one or more of the following:

A) Positive $S_{rxlevel}$ slope value
B) Consecutive positive trend

Neighbor cells with positive slope values may be ranked higher than neighbor cells with negative value since coverage is improving for the neighbor cell. The neighbor cell with consecutive positive differences (current $S_{rxlevel}$>previous $S_{rxlevel}$) with each measurement interval may also indicate that the cell coverage is improving and hence the cell may be classified higher than neighbor cells that exhibit consecutive negative difference (current $S_{rxlevel}$<previous $S_{rxlevel}$).

Figure 21:
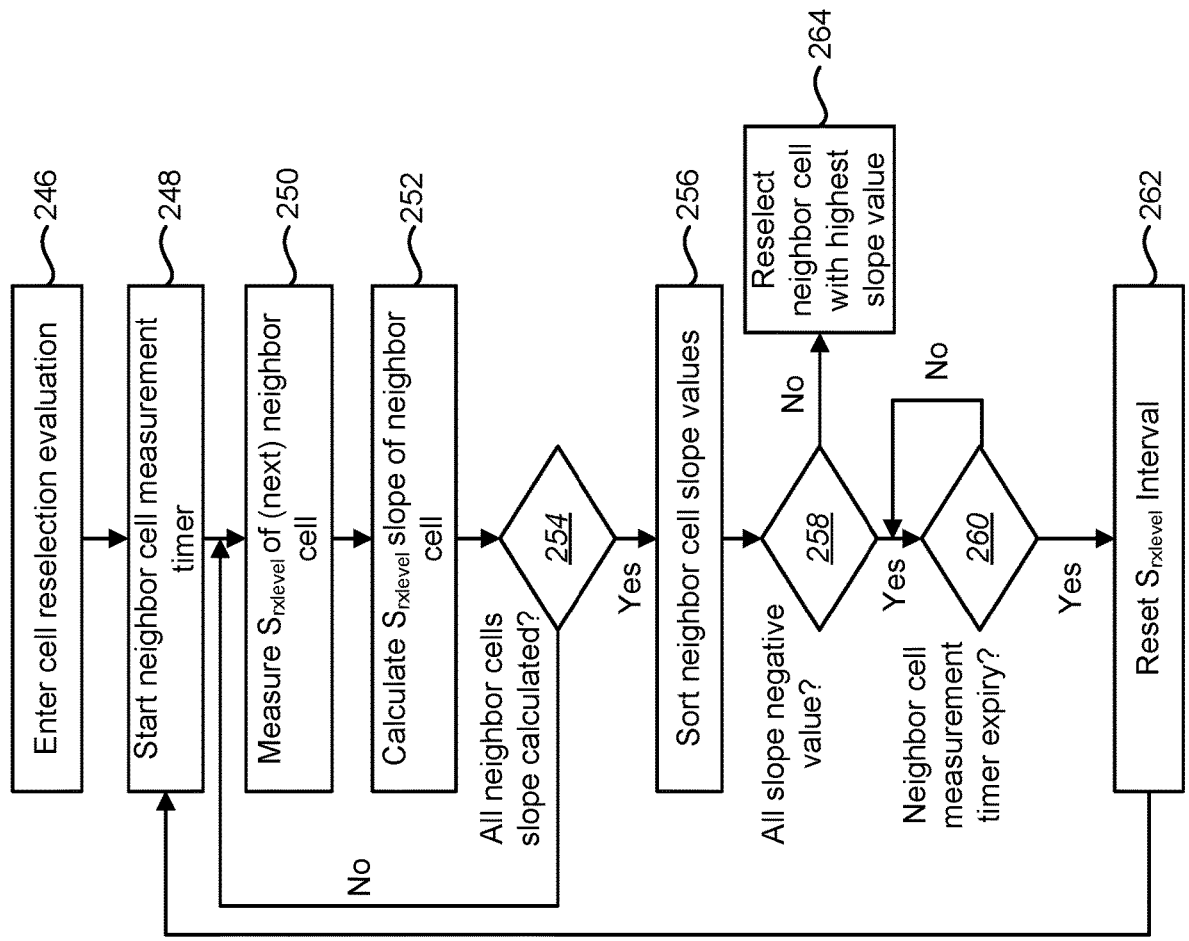
FIG. 21 is a flow diagram depicting steps performed by a wireless terminal to determine best suited NTN neighbor cell for cell reselection.

FIG. 21 is a flow diagram 2100 that depicts representative steps or acts performed by a wireless terminal to determine best suited NTN neighbor cell for cell reselection. As noted in FIG. 16 at 204, in FIG. 17 at 228, and in FIG. 20 at 244, the wireless terminal may enter cell reselection evaluation process 246. A neighbor cell measurement timer may start 248. The neighbor cell measurement timer interval may be defined by the network since the value is dependent on satellite coverage characteristics. The wireless terminal may measure 250 $S_{rxlevel}$ of each neighbor cell. The calculation of neighbor cell $S_{rxlevel}$ slope may be performed 252 by methods described in FIGS. 14 and 15. It is then determined 254 whether all neighbor cells slope values have been calculated. Once slope values have been calculated 252 for each neighbor cell, the wireless terminal may sort 256 the slope values. If it is determined 258 that all slope values are negative, then the next slope value will be calculated if it is determined 260 that the neighbor cell measurement timer has expired. If the neighbor cell measurement timer has expired the neighbor cell measurement timer may reset 262 so that next measurement can occur.

A new cell may be reselected 264 if a positive value slope is present after sorting 256. If multiple positive value slopes are present, then the wireless terminal may select the neighbor cell with the highest value.

Listing 7 is an example implementation of rxlevelNeighborInterval, a neighbour cell measurement timer interval for NTN cell.

```
-- ASN1START
SystemInformationBlockType32-r17 ::= SEQUENCE {
    satelliteInfoList-r17        SatelliteInfoList-r17
        OPTIONAL, -- Need OR
    nonCriticalExtension         SEQUENCE { }
        OPTIONAL,
    ...
}
SatelliteInfoList-r17 ::= SEQUENCE (SIZE (1..maxSat-r17))
    OF SatelliteInfo-r17}
SatelliteInfo-r17 ::= SEQUENCE {
    satelliteSAI-r17             CHOICE {
    sgp4EphemerisParameters-r17
        SGP4EphemerisParameters-r17
    earthFixedCellParameters-r17
        EarthFixedCellParameters-r17
    nonCriticalExtension         SEQUENCE { }
    }
    satelliteID-r17              INTEGER (0..255)
        OPTIONAL,
    satelliteFootprintParameters-r17
        SatelliteFootprintParameters-r17    OPTIONAL,
    nonCriticalExtension         SEQUENCE { }
        OPTIONAL,
}
    EarthFixedCellParameters-r17 ::= SEQUENCE {
    t-ServiceStart-r17           SEQUENCE ( SIZE (1..10))
    OF INTEGER (0..1048575)
    nonCriticalExtension         SEQUENCE { }
}
SGP4EphemerisParameters-r17 ::= SEQUENCE {
    inclination-r17              INTEGER (0..2097151)
    periapsis-r17                INTEGER (0..2097151)
    longitude-r17                INTEGER (0..4194303)
        anomaly-r17              INTEGER (0..4194303)
    eccentricity-r17             INTEGER (0..16777215)
    meanMotion-r17               INTEGER (0..17179869183)
        revNoEpoch-r17           INTEGER (0..131071)
        bStar-r17                BIT STRING (23)
        epochStar-r17            INTEGER (-1048575..1048575)
}
    SatelliteFootprintParameters-r17 ::= SEQUENCE {
    elevationAngleR-r17          INTEGER (-7..7)
        OPTIONAL,
    elevationAngleL-r17          INTEGER (-7..7)
        OPTIONAL,
    refPointX-r17                INTEGER (X1..X2)
        OPTIONAL,
```

-continued

```
    refPointY-r17           INTEGER (Y1..–Y2)
      OPTIONAL,
    refRadius-r17           INTEGER (1..200)
      OPTIONAL,
    nonCriticalExtension    SEQUENCE { }
      OPTIONAL,
  }
  SatelliteNeighborRxLevelParameters-r17 ::= SEQUENCE {
    rxlevelNeighbor Interval   INTEGER (1..7200)
      OPTIONAL,
    nonCriticalExtension    SEQUENCE { }
      OPTIONAL,
  }
-- ASN1STOP
```

Listing 7

Another method to determine best suited NTN neighbor cell for reselection may be to calculate number of consecutive positive differences between current and previous neighbor cell $S_{rxlevel}$. After expiry of neighbor cell measurement interval, the wireless terminal may measure neighbor cell received power ($S_{rxlevel}$) and determine if the value is greater than the previous $S_{rxlevel}$. If the $S_{rxlevel}$ is greater than previous $S_{rxlevel}$ for the next neighbor cell measurement time interval, a positive counter, unique to each cell, is incremented. A neighbor cell that has a positive counter of at least 2 is the best suited NTN neighbor cell for reselection.

Figure 22:
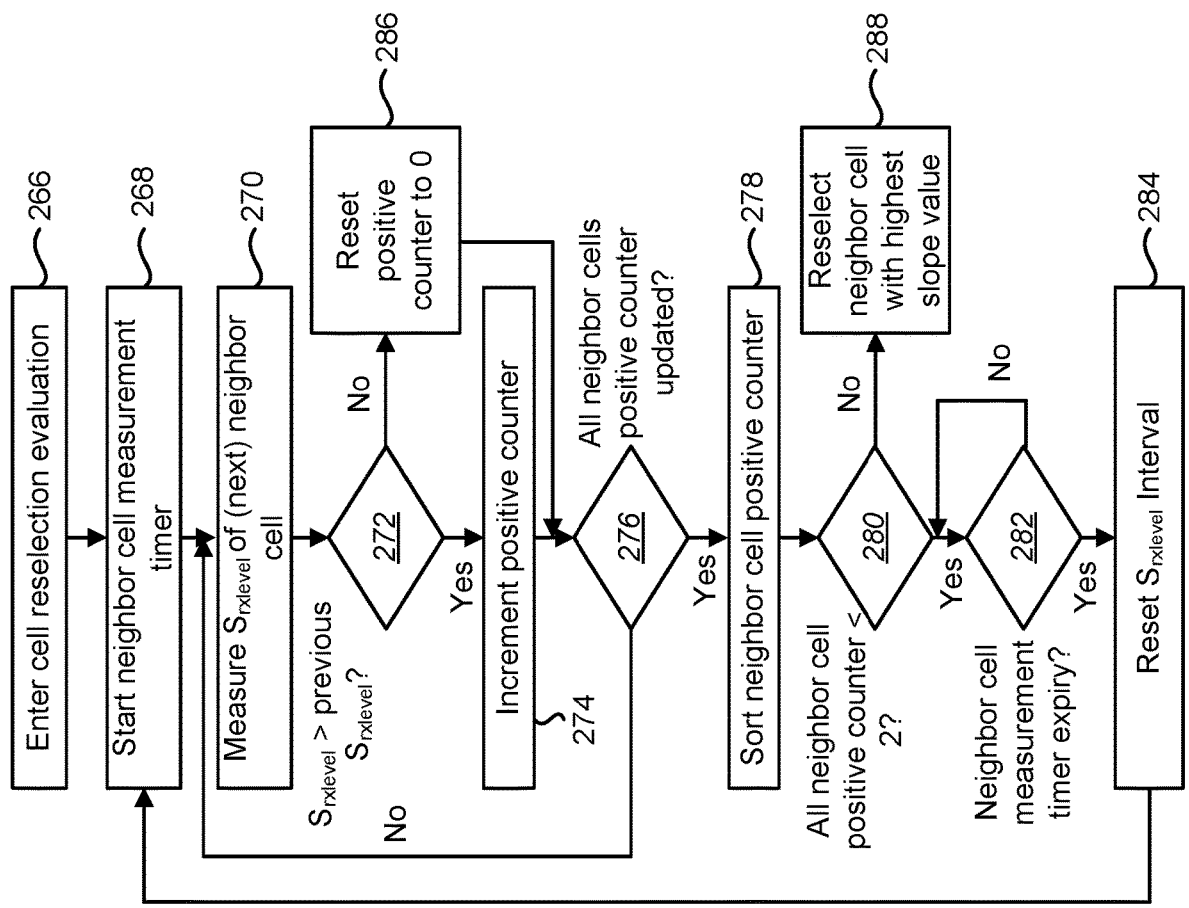
FIG. 22 is a flow diagram depicting steps performed by a wireless terminal to determine best suited NTN neighbor cell for cell reselection.

FIG. 22 is a flow diagram 2200 that depicts representative steps or acts performed by a wireless terminal to determine best suited NTN neighbor cell for cell reselection. As noted in FIG. 16 at 204, in FIG. 17 at 228, and in FIG. 20 at 244, the wireless terminal may enter 266 cell reselection evaluation process. A neighbor cell measurement timer may start 268. The neighbor cell measurement timer interval may be defined by the network since the value is dependent on satellite coverage characteristics. The wireless terminal may then measure 270 $S_{rxlevel}$ of (next) neighbor cell. The wireless terminal may then determine 272 whether the $S_{rxlevel}$ is greater than the previous $S_{rxlevel}$. If the $S_{rxlevel}$ is not greater than the previous $S_{rxlevel}$, then the wireless terminal may reset 286 positive counter to 0. If the $S_{rxlevel}$ is greater than the previous $S_{rxlevel}$, then the positive counter is incremented 274. Steps 270, 272, 286 and 274 may be performed for each NTN neighbor cell. The counter referenced in step 286 and 274 are unique for each neighbor cell. Once the wireless terminal completes measurement and assessment of $S_{xlevel}$ for each neighbor cell 276, the counters are sorted and compared 278. It is then determined 280 whether any of the counters are greater than or equal to 2, implying that the coverage continued to improve 2 consecutive time intervals. If any of the counters are greater than or equal to 2, then the cell with the highest counter value is best suited for reselection 288. If there are no counters greater or equal to 2, then the updating of positive counter for each neighbor cell may be repeated. It may be determined 282 that the neighbor cell measurement timer has expired. If the neighbor cell measurement timer has expired, the $S_{rxlevel}$ interval may reset 284 so that the neighbor cell measurement timer may start 268 and the process can repeat.

Embodiment 3

Figure 23:
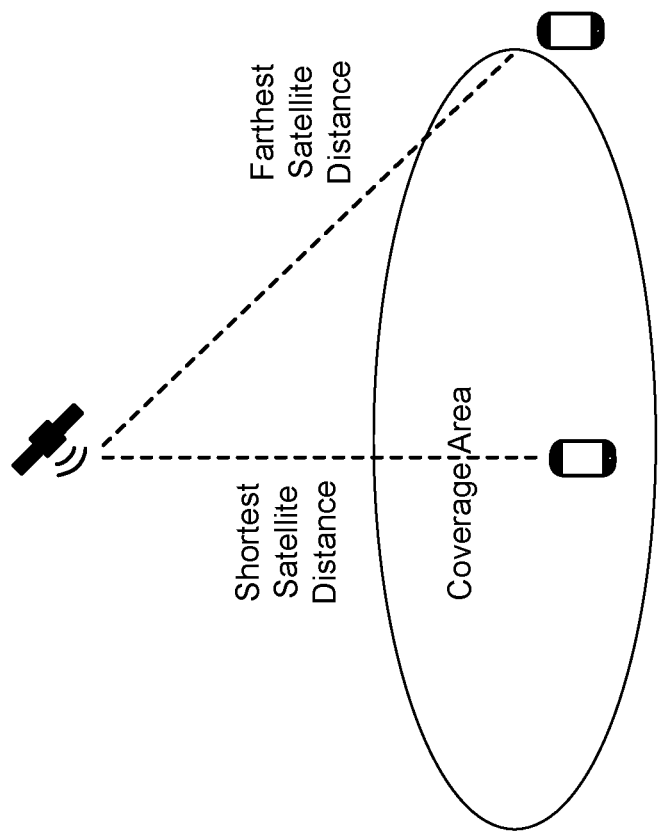
FIG. 23 is a diagram illustrating variations in satellite distance with respect to location of a wireless terminal.

A method to reduce serving cell measurement may include evaluation of additional parameters including satellite distance. The wireless terminal may:

1) Calculate satellite distance slope or the ratio of change in satellite distances with respect to time using current and previous satellite distances
2) Determine measurement triggers by evaluating slope values
3) Calculate trend of satellite distance to determine measurement triggers Satellite distance is the distance between the satellite and the wireless terminal. FIG. 23 is a diagram 2300 illustrating variations in satellite distance with respect to location of wireless terminal. At minimum distance value, the satellite is directly overhead of wireless terminal. The received power level is strongest at the minimum satellite distance. The maximum satellite distance provides the lowest received power level to the wireless terminal. Satellite distance may be calculated using known formulas and requires satellite ephemeris data along with wireless terminal location information.

Figure 24:
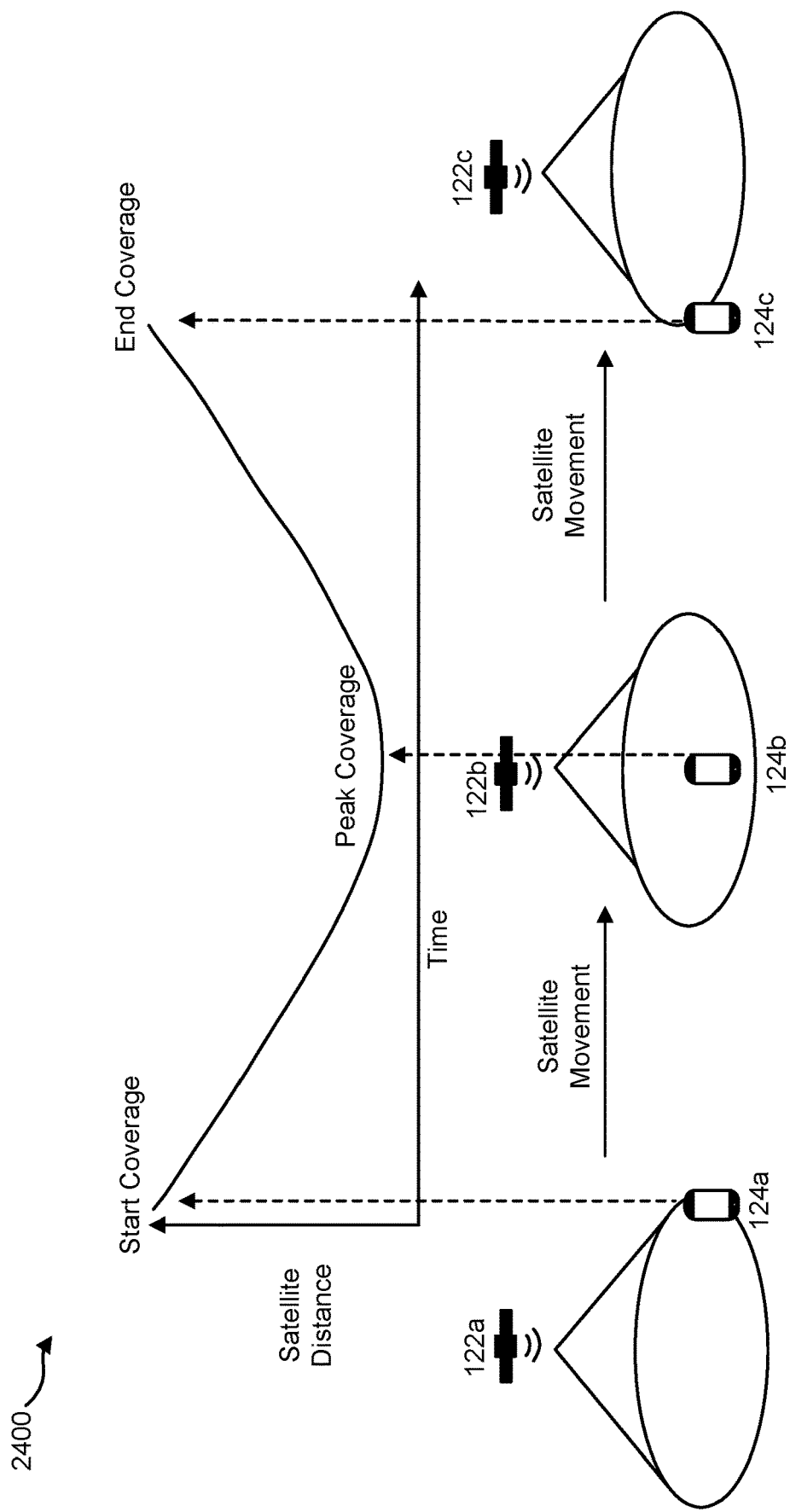
FIG. 24 is a diagram illustrating the relationship between satellite distance and corresponding coverage states.

FIG. 24 is a diagram 2400 illustrating the relationship between satellite distance and corresponding coverage states from FIG. 1. At the start of coverage, the satellite distance is farthest away. As the satellite distance decreases, the coverage improves until peak coverage time, at which the satellite distance is the shortest. Once peak coverage occurs, the satellite distance increases again until the satellite moves away from the wireless terminal.

Another method that may reduce excessive cell reselections performed by wireless terminal is comprised of wireless terminal that calculates slope values of serving cell received power measurements. The wireless terminal may compare calculated slope values with a threshold value broadcasted by network. Additionally, the wireless terminal may compare the calculated distance with a threshold distance value broadcasted by the network. As depicted in FIG. 24, the values of satellite distances ($S_{distance}$) may vary depending on the location of the satellite with respect to the wireless terminal. The slope may be calculated by using the same methods as the elevation angle slope values described in FIG. 6 and FIG. 7.

Figure 25:
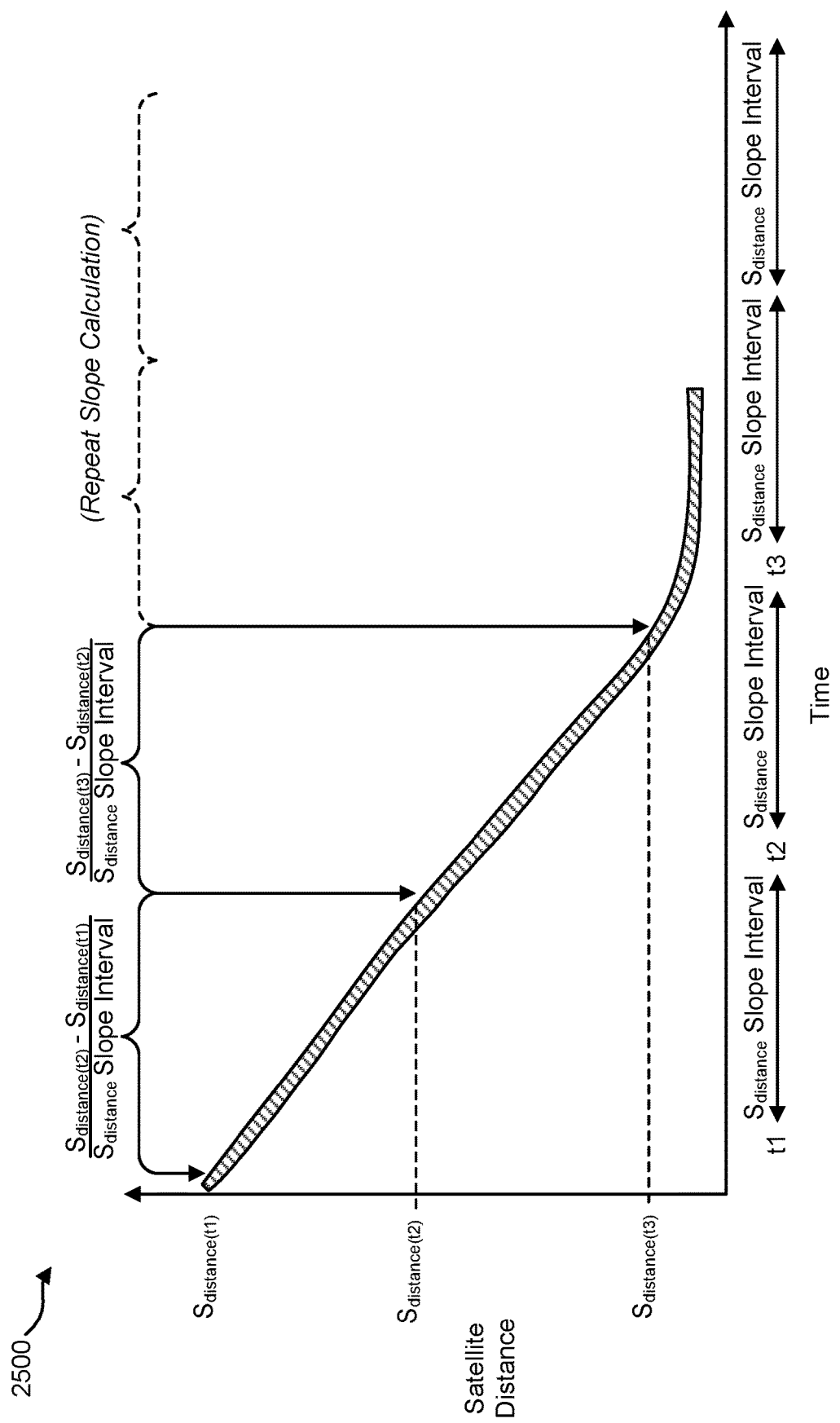
FIG. 25 is a graph illustrating distance changes between start of satellite coverage and peak coverage.

FIG. 25 is a graph 2500 illustrating the satellite distance changes between start of satellite coverage and the peak coverage. In this example, at t1, the wireless terminal may calculate satellite distance ($S_{distance(t1)}$). At t2, (t1+$S_{distance}$ Slope Interval), the satellite distance may be calculated ($S_{distance(t2)}$). For slope calculation, the difference between current ($S_{distance(t2)}$) and previous $S_{distance(t3)}$ is divided by $S_{distance}$ Slope Interval. The next slope value at t3 is calculated using $S_{distance}$(t3) as current and $S_{distance(t2)}$ as previous satellite distances. A negative satellite distance slope may indicate that receive power is increasing. At the beginning of satellite coverage, the $S_{rxlevel}$ may be lower than the cell reselection threshold values ($S_{IntraSearchP}/S_{NonIntraSearchP}$) transmitted by the network. As a result, the cell reselection evaluation process may be triggered even though coverage may improve. To prevent excess cell reselections, the wireless terminal may evaluate the trend of the calculated slope values. If the slope continues to be negative, then the wireless terminal may choose not to perform cell reselection evaluation process.

Figure 26:
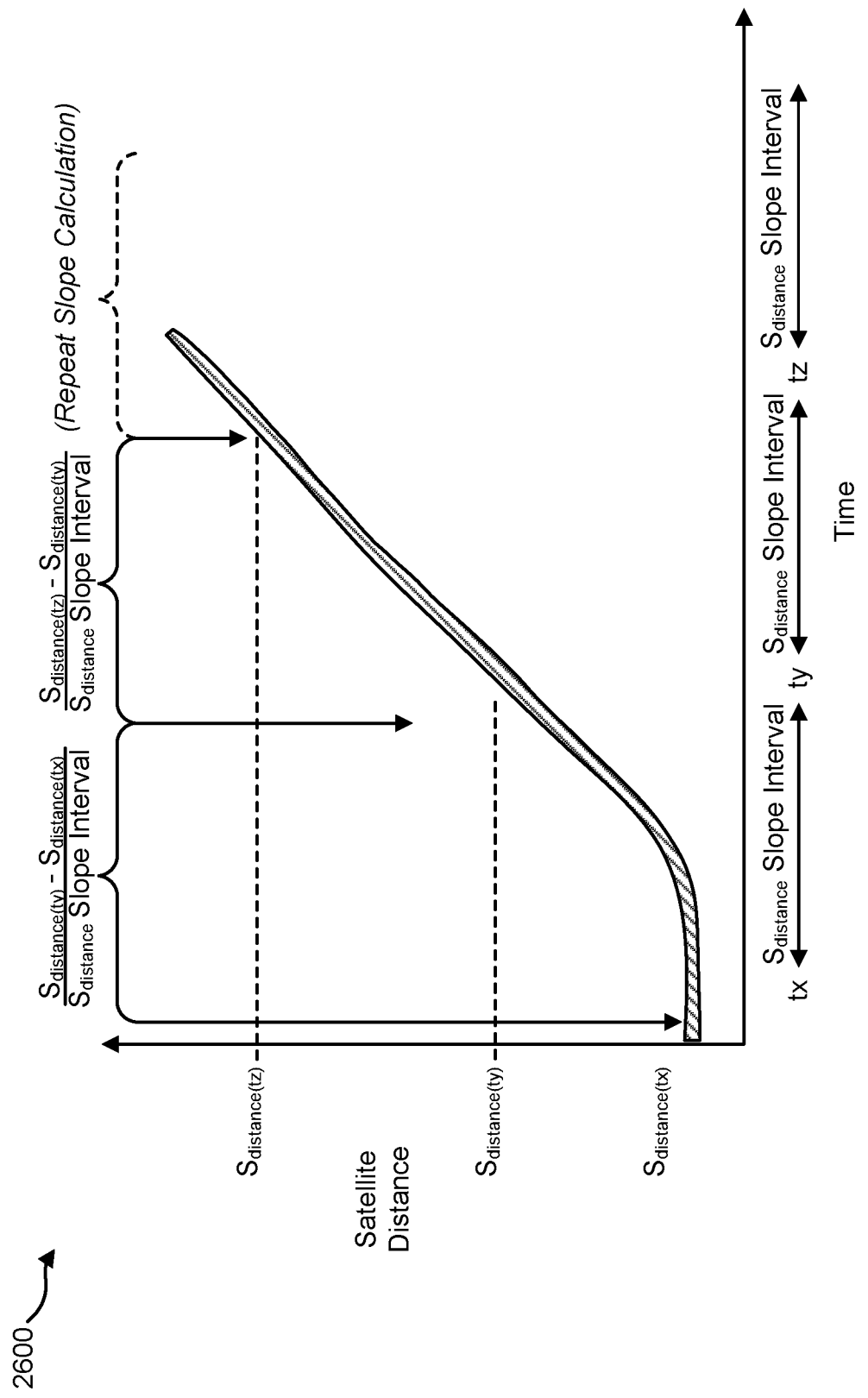
FIG. 26 is a graph illustrating distance changes between time of peak coverage and end of coverage.

FIG. 26 is a graph 2600 illustrating the $S_{distance}$ changes between time of peak coverage and end of coverage. As the satellite continues to move away from the wireless terminal, calculated slope values may switch to a positive value, indicating a continuous drop in $S_{rxlevel}$. If satellite distance slope trends positive or the slope is greater than the satellite distance slope threshold and the satellite distance exceeds the value of a distance threshold, the wireless terminal may start cell reselection evaluation process by comparing $S_{rxlevel}$ with the (intra/inter frequency) $S_{rxlevel}$ thresholds. The wireless terminal may also revert to measuring serving cell received power every DRX cycle.

Figure 27:
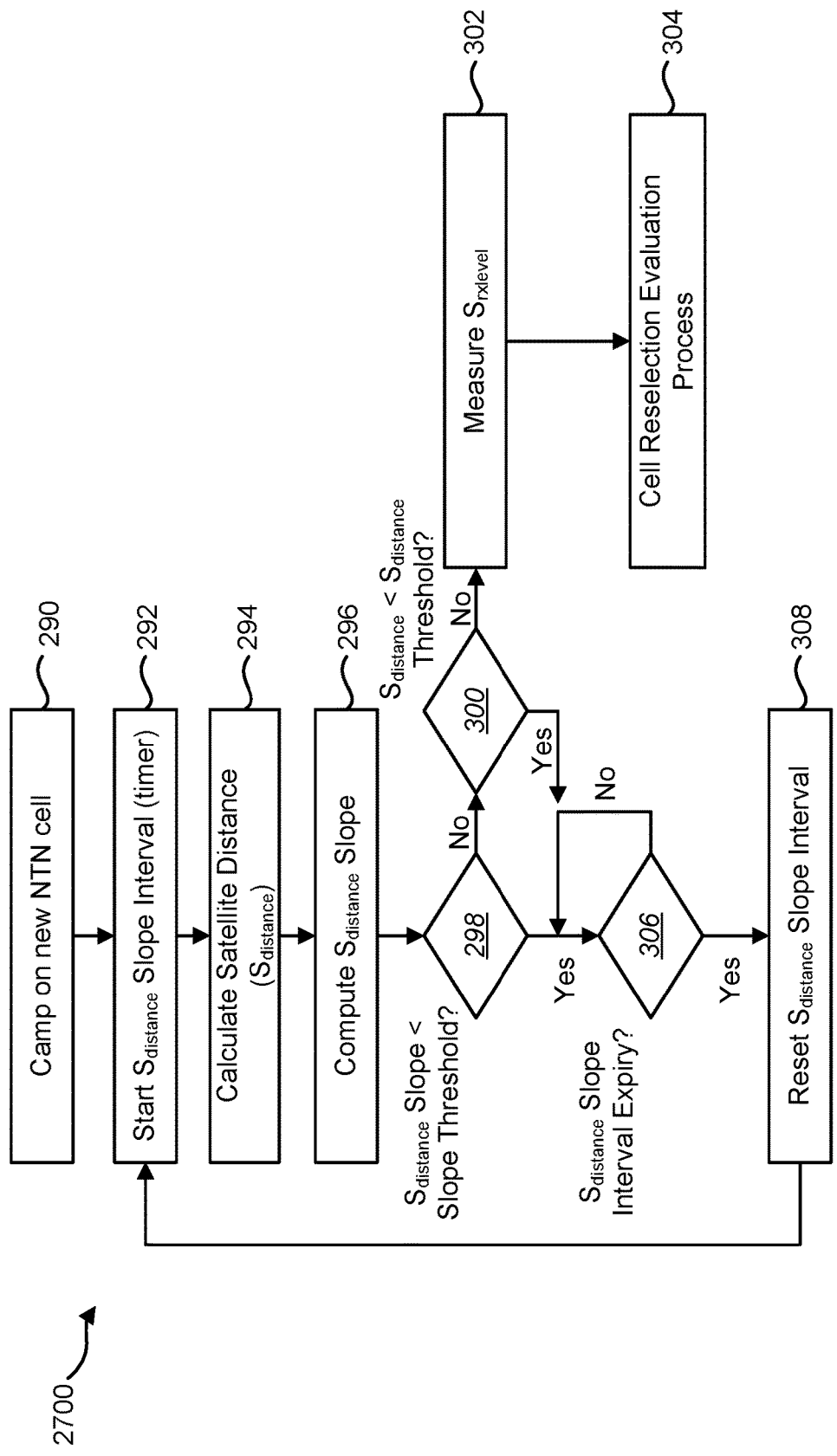
FIG. 27 is a flow diagram depicting steps performed by a wireless terminal once it is camped on to an NTN cell.

FIG. 27 is a flow diagram 2700 depicting steps performed by a wireless terminal once it is camped 290 on to an NTN cell. The wireless terminal may also receive the following parameters via broadcasted message:
   a. $S_{distance}$ Slope Threshold
   b. $S_{distance}$ Threshold
   c. $S_{distance}$ Slope Interval Timer The wireless terminal may then start 292 $S_{distance}$ Slope Interval (timer). The wireless terminal may then calculate 294 satellite distance ($S_{distance}$). The current $S_{distance}$ Slope value may then be computed 296 using the formulas described in FIGS. 6 and 7. The wireless terminal may then compare 298 $S_{distance}$ Slope with the $S_{distance}$ Slope Threshold value. If the $S_{distance}$ Slope value is greater than the $S_{angle}$ Slope Threshold value, then the $S_{distance}$ is compared 300 with $S_{distance}$ Threshold. If $S_{distance}$ is greater than $S_{distance}$ Threshold, the wireless terminal measures 302 serving cell received power level and cell reselection evaluation process may begin 304 since the satellite coverage may continue to move away from the wireless terminal. If $S_{distance}$ Slope value is less than or equal to $S_{distance}$ Slope Threshold, the wireless terminal may determine 306 if the $S_{distance}$ Slope Interval expired. Once the $S_{distance}$ Slope Interval has expired, the wireless terminal may reset 308 the $S_{distance}$ Slope Interval and return to calculate slope value.

Figure 28:
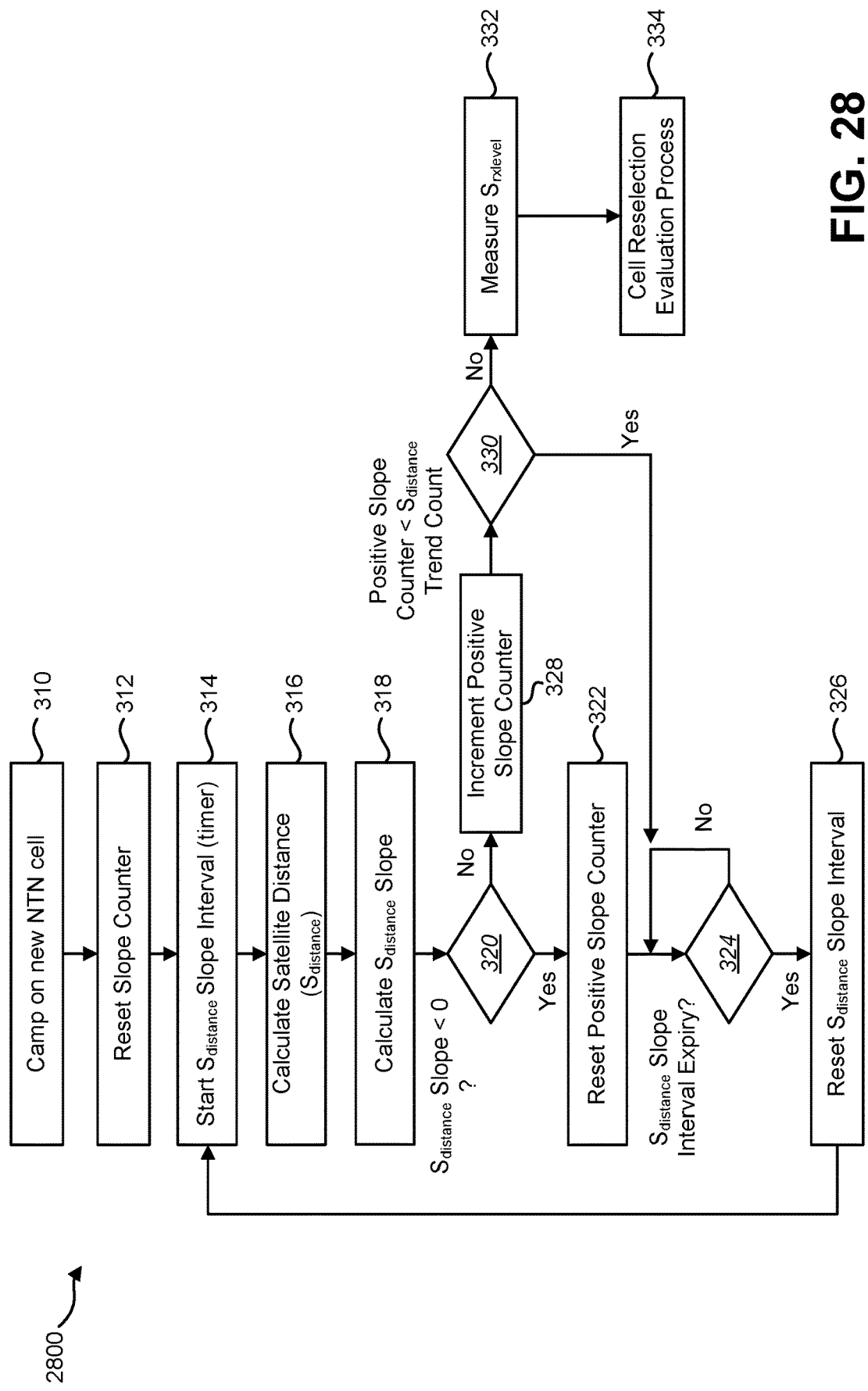
FIG. 28 is a flow diagram depicting the steps performed by a wireless terminal to compare distance values to determine trend distance values.

FIG. 28 is a flow diagram 2800 depicting another example of steps performed by a wireless terminal to compare previous $S_{distance}$ Slope values to determine trend of $S_{distance}$ values. The wireless terminal camps 310 on a new cell. The wireless terminal may then reset 312 a positive slope counter to 0. As in the previous example, the wireless terminal may then start 314 $S_{distance}$ Slope Interval (timer). The wireless terminal may then calculate 316 satellite distance ($S_{distance}$). The current $S_{distance}$ Slope value may then be computed 318 using the formulas described in FIGS. 6 and 7. The wireless terminal may then check 320 if the $S_{distance}$ slope is less than 0. If the calculated $S_{distance}$ Slope value is less than 0, the positive slope counter is reset 322. The wireless terminal may then check 324 if the $S_{distance}$ Slope Interval expired. Once the $S_{distance}$ Slope Interval has expired, the wireless device may reset 326 $S_{distance}$ Slope Interval to start the next slope calculation.

If it is determined 320 that the calculated $S_{distance}$ Slope value is positive, the positive slope counter is incremented 328. The positive slope counter is then compared 330 with $S_{distance}$ Trend Count. $S_{distance}$ Trend Count may be defined by the network and is the consecutive number of times satellite distance slopes upwards, which may indicate that the satellite may transition to out of coverage. If the positive slope counter is greater than the $S_{distance}$ Trend Count, the wireless terminal may then measure 332 $S_{rxlevel}$. The $S_{rxlevel}$ may then be used for cell reselection evaluation process 334.

If no suitable cell is discovered during the cell reselection evaluation process, the wireless terminal may proceed to use DRX or a different timer defined for serving cell measurement interval.

The value of $S_{distance}$ Slope Interval and $S_{distance}$ Slope Threshold may depend on type of satellite (LEO, MEO), beam path/orbit and elevation from earth. A satellite with a large beam path (>1000 km2), may have a longer coverage time than a satellite with lower beam path (<100 km2). As a result, the $S_{distance}$ Slope Timer and $S_{distance}$ Slope Threshold may be adjusted accordingly by the network.

```
-- ASN1START
SystemInformationBlockType32-r17 ::= SEQUENCE {
    satelliteInfoList-r17                   SatelliteInfoList-r17
      OPTIONAL,   -- Need OR
    nonCriticalExtension              SEQUENCE { }
    OPTIONAL,
    ...
}
SatelliteInfoList-r17 ::= SEQUENCE (SIZE (1..maxSat-r17))
OF SatelliteInfo-r17}
SatelliteInfo-r17 ::= SEQUENCE {
    satelliteSAI-r17
    sgp4EphemerisParameters-r17        CHOICE {
                                          SGP4EphemerisParameters-
r17
      earthFixedCellParameters-r17
      EarthFixedCellParameters-r17
      nonCriticalExtension            SEQUENCE { }
      }
      satelliteID-r17                 INTEGER (0..255)
    OPTIONAL,
      satelliteFootprintParameters-r17
      SatelliteFootprintParameters-r17                    OPTIONAL,
      nonCriticalExtension            SEQUENCE { }
    OPTIONAL,
    }
      EarthFixedCellParameters-r17 ::= SEQUENCE {
      t-ServiceStart-r17                    SEQUENCE( SIZE (1..10)) OF
INTEGER (0..1048575)
      nonCriticalExtension            SEQUENCE { }
    }
    SGP4EphemerisParameters-r17 ::= SEQUENCE {
        inclination-r17               INTEGER (0..2097151)
        periapsis-r17                 INTEGER (0..2097151)
        longitude-r17                 INTEGER (0..4194303)
        anomaly-r17                   INTEGER (0..4194303)
        eccentricity-r17              INTEGER (0..16777215)
        meanMotion-r17                INTEGER (0..17179869183)
        revNoEpoch-r17                INTEGER (0..131071)
```

```
        bStar-r17                       BIT STRING (23)
        epochStar-r17                   INTEGER (-1048575..1048575)
}
SatelliteFootprintParameters-r17 ::= SEQUENCE
    elevationAngleR-r17                 INTEGER (-7..7)
    OPTIONAL,
    elevationAngleL-r17                 INTEGER (-7..7)
    OPTIONAL,
    refPointX-r17                       INTEGER (X1..X2)        OPTIONAL,
    refPointY-r17                       INTEGER (Y1..-Y2)       OPTIONAL,
    refRadius-r17                       INTEGER (1..200)
    OPTIONAL,
    nonCriticalExtension                SEQUENCE { }            OPTIONAL,
}
SatelliteElevationAngleParameters-r17 ::= SEQUENCE {
    satelliteDistanceInterval           INTEGER (1..7200)
    OPTIONAL,
    satelliteDistanceSlopeThreshold     INTEGER (0..10000)
        OPTIONAL,
    satelliteDistancePositiveCount      INTEGER (2..100)
    OPTIONAL,
    satelliteDistanceThreshold          INTEGER (0..10000)
    OPTIONAL,
    nonCriticalExtension                SEQUENCE { }            OPTIONAL,
}
-- ASN1STOP
```

Listing 8

Listing 8 is an example implementation of satelliteDistanceInterval ($S_{distance}$ Slope Interval), satelliteDistanceSlopeThreshold ($S_{distance}$ Slope Threshold), satelliteDistancePositiveCount ($S_{distance}$ Trend Count), and satelliteDistanceThreshold ($S_{distance}$) that are comprised in System Information Block Type 32 (SIB 32).

The network may decide that the satellite distance slope timer interval may remain constant. In this case, the network may not transmit a rrcConnectionReconfiguration message with a modified $S_{distance}$ Slope value. If the $S_{distance}$ Slope Interval will not change for each satellite, the slope calculation, as described previously may not be necessary. As an alternative, new parameters are introduced: $S_{distance}$ Interval and $S_{distance}$ Threshold.

Figure 29:
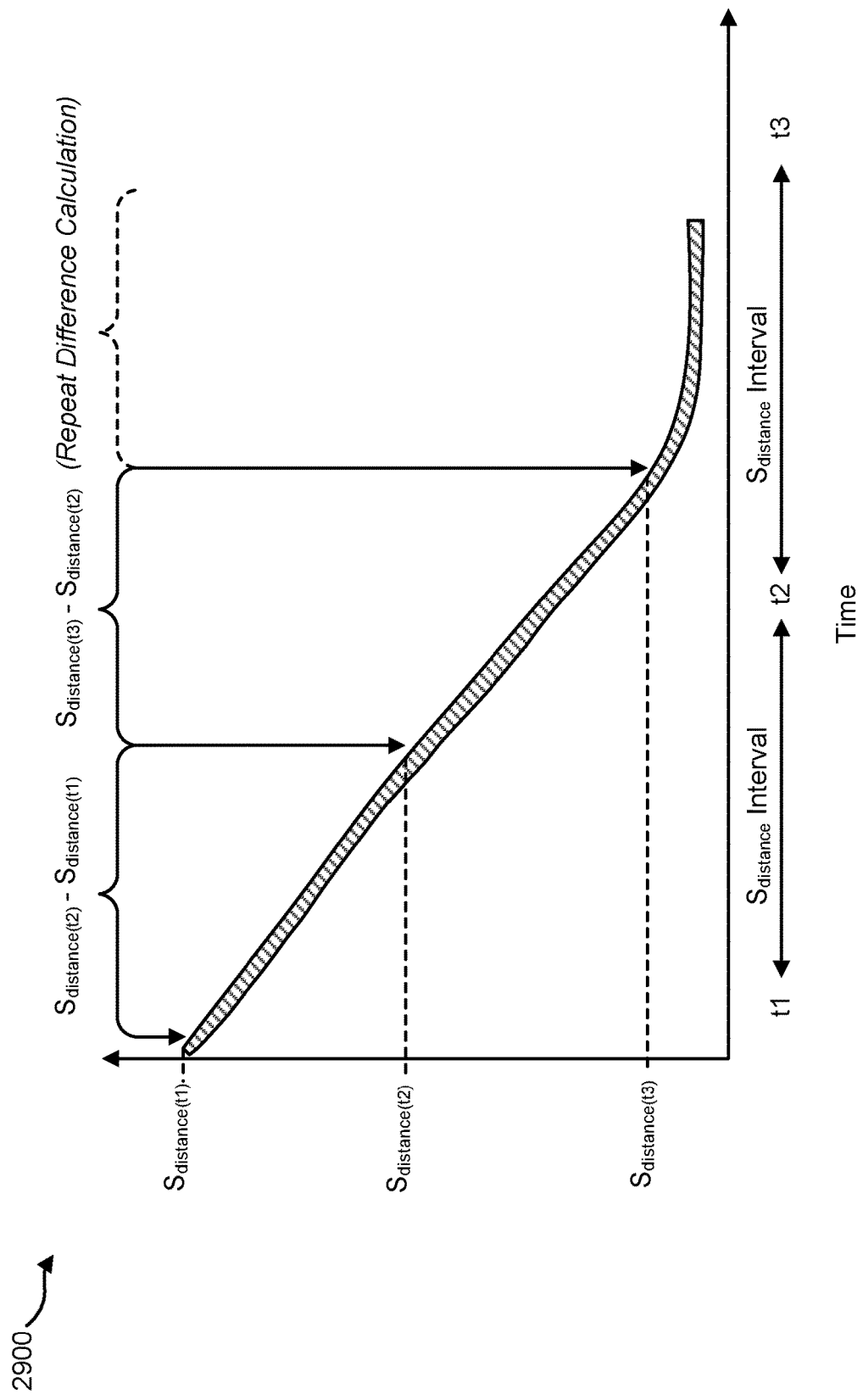
FIG. 29 is a graph illustrating satellite distance changes from start of coverage to peack coverage.

FIG. 29 is a graph 2900 illustrating the satellite distance changes from start of coverage to peak coverage. The wireless terminal may calculate the satellite distance at time t(1). After the expiry of $S_{distance}$ Interval at time t(2), the wireless terminal may calculate satellite distance, $S_{distance}$ (t2). The wireless terminal may compute the difference between current satellite distance ($S_{distance}$ (t2)), and previous satellite distance ($S_{distance}$ (t1)). If the result is less than $S_{distance}$ Threshold, the wireless terminal may choose not to perform cell reselection evaluation. The wireless terminal may calculate the satellite distance after the expiry of $S_{distance}$ Interval at t3. The difference between current $S_{distance}$ (t3) and previous $S_{distance}$ (t2) will be compared with the $S_{distance}$ Threshold value. The process of calculating satellite distance and comparing the result with the threshold after each expiry of $S_{distance}$ Interval may continue until the wireless terminal camps on a new cell or the satellite coverage ceases.

Figure 30:
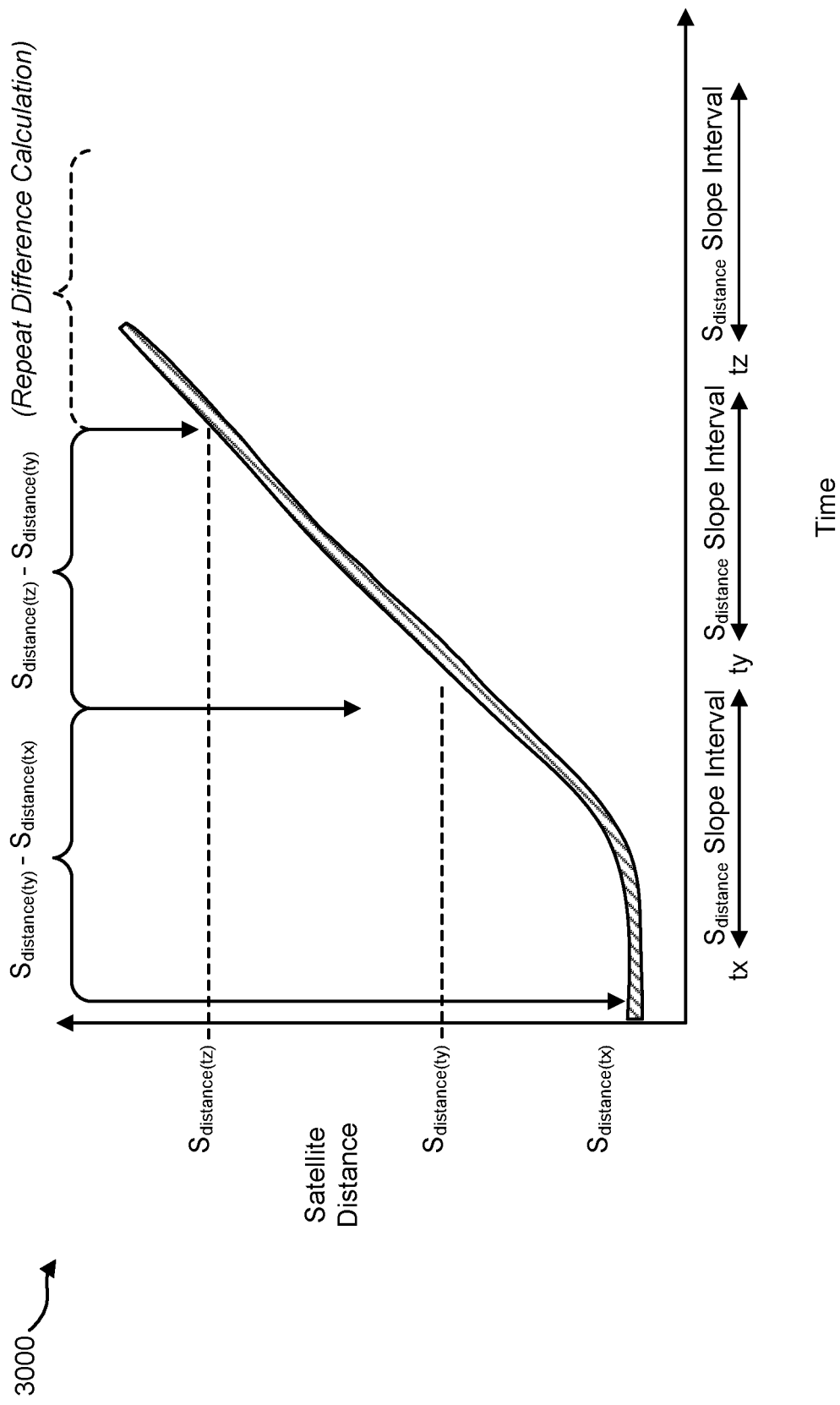
FIG. 30 is a graph illustrating satellite distance values between peack coverage and end of coverage.

FIG. 30 is a graph 3000 illustrating the satellite distance values between peak coverage and end of coverage similar. The wireless terminal may calculate $S_{distance}$ every $S_{distance}$ Interval and computes differences between current and previous $S_{distance}$. In this example, the $S_{distance}$ Interval expired at t(x). $S_{distance}$ may be calculated by the wireless terminal and the difference is compared with $S_{distance}$ Difference Threshold. The process may continue for every $S_{distance}$ Interval until the result of the difference is greater than the $S_{distance}$ Difference Threshold. The wireless terminal may choose to perform cell reselection evaluation process if the difference is greater than the $S_{distance}$ Difference Threshold and the current $S_{distance}$ exceeds the $S_{distance}$ Threshold.

Figure 31:
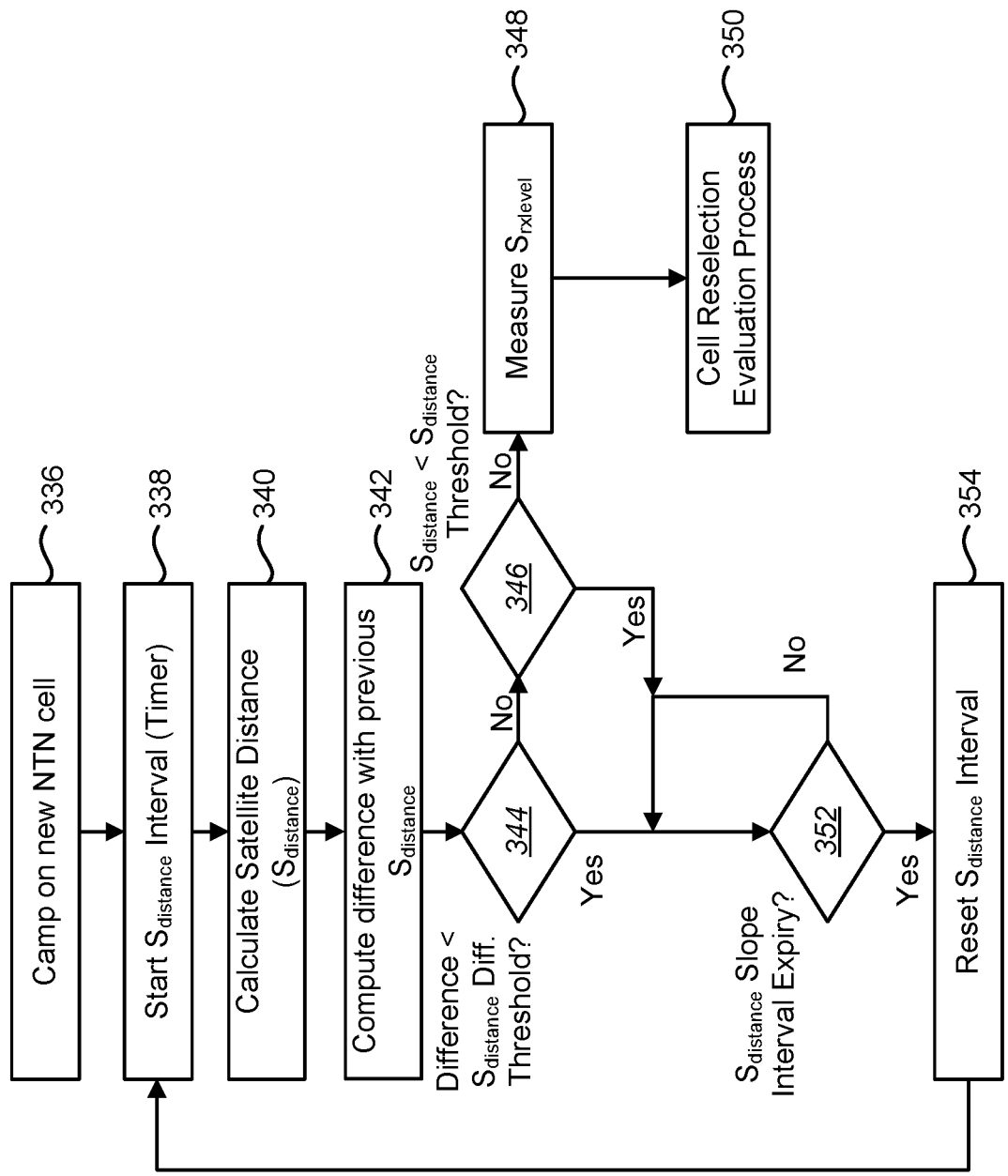
FIG. 31 is a flow diagram depicting the steps performed by a wireless terminal to reduce cell reselections while connected to a satellite network.

FIG. 31 is a flow diagrapm 3100 depicting steps or acts performed by a wireless terminal to reduce cell reselections while connected to a satellite network. Once a wireless terminal is camped 336 on a new NTN satellite cell, the $S_{distance}$ Interval, a timer, starts 338. The wireless terminal may then calculate 340 satellite distance. The wireless terminal may then compute 342 the difference between the current satellite distance and previous satellite distance (Current $S_{distance}$-Previous $S_{distance}$). It is then determined 344 if the difference is less than the $S_{distance}$ Difference Threshold. If the satellite distance difference is not less than the $S_{distance}$ Difference Threshold, then the current $S_{distance}$ is compared 346 with the $S_{distance}$ Threshold. If the $S_{distance}$ exceeds the $S_{distance}$ Threshold, the satellite coverage may enter discontinuous service or period of no coverage. As a result, the wireless terminal may measure 348 serving cell received power and start 350 cell reselection evaluation procedure.

If the satellite distance difference is less than or equal to the $S_{distance}$ Difference Threshold, the wireless terminal may choose not to perform cell reselection evaluation process. The wireless terminal may check 352 if the $S_{distance}$ Interval timer has expired expires. Once the $S_{distance}$ Interval timer has expired, the $S_{distance}$ Interval timer may reset 354 to 0 and the process will restart 338.

```
-- ASN1START
SystemInformationBlockType32-r17 ::= SEQUENCE {
    satelliteInfoList-r17           SatelliteInfoList-r17
        OPTIONAL,                   -- Need OR
    nonCriticalExtension            SEQUENCE { }
    OPTIONAL,
    ...
}
```

-continued

```
SatelliteInfoList-r17 ::= SEQUENCE (SIZE (1..maxSat-r17))
OF SatelliteInfo-r17}
SatelliteInfo-r17 ::= SEQUENCE {
    satelliteSAI-r17            CHOICE {
    sgp4EphemerisParameters-r17   SGP4EphemerisParameters-
r17
    earthFixedCellParameters-r17
    EarthFixedCellParameters-r17
        nonCriticalExtension        SEQUENCE { }
    }
    satelliteID-r17             INTEGER (0..255)
OPTIONAL,
    satelliteFootprintParameters-r17
    SatelliteFootprintParameters-r17     OPTIONAL,
        nonCriticalExtension        SEQUENCE { }
    OPTIONAL,
}
    EarthFixedCellParameters-r17 ::= SEQUENCE {
        t-ServiceStart-r17          SEQUENCE( SIZE (1..10)) OF
INTEGER (0..1048575)
            nonCriticalExtension    SEQUENCE { }
}
SGP4EphemerisParameters-r17 ::= SEQUENCE {
        inclination-r17             INTEGER (0..2097151)
        periapsis-r17               INTEGER (0..2097151)
        longitude-r17               INTEGER (0..4194303)
        anomaly-r17                 INTEGER (0..4194303)
        eccentricity-r17            INTEGER (0..16777215)
        meanMotion-r17              INTEGER (0..17179869183)
        revNoEpoch-r17              INTEGER (0..131071)
          bStar-r17                 BIT STRING (23)
        epochStar-r17               INTEGER (-1048575..1048575)
}
SatelliteFootprintParameters-r17 ::= SEQUENCE {
    elevationAngleR-r17         INTEGER (-7..7)
    OPTIONAL,
    elevationAngleL-r17         INTEGER (-7..7)
    OPTIONAL,
    refPointX-r17               INTEGER (X1..X2)     OPTIONAL,
    refPointY-r17               INTEGER (Y1..-Y2)    OPTIONAL,
    refRadius-r17               INTEGER (1..200)
    OPTIONAL,
        nonCriticalExtension    SEQUENCE { }         OPTIONAL,
}
SatelliteElevationAngleParameters-r17 ::= SEQUENCE {
    satelliteDistanceInterval   INTEGER (1..7200)
    OPTIONAL,
    satelliteDifferenceDistanceThreshold             INTEGER
(0..10000)                  OPTIONAL,
    satelliteDistanceThreshold  INTEGER (0..10000)
    OPTIONAL,
        nonCriticalExtension    SEQUENCE { }         OPTIONAL,
}
-- ASN1STOP
```

Listing 9

Listing 9 is an example implementation of satelliteDistanceInterval ($S_{distance}$ Interval), satelliteDifferenceDistanceThreshold ($S_{distance}$ Difference Threshold) and satelliteDistanceThreshold ($S_{distance}$ Threshold) that are comprised in System Information Block Type 32 (SIB 32).

If the serving cell fulfils Srxlev>$S_{IntaSearchP}$, the UE may choose not to perform intra-frequency measurements.

Else if the satellite distance slope is less than satellite distance slope threshold and the satellite distance is less than satellite distance threshold, or satellite distance trends negative, the UE may choose not to perform intra-frequency measurements Otherwise, the UE shall perform intra-frequency measurements.

The UE shall apply the following rules for NB-IoT inter-frequencies which are indicated in system information:

If the serving cell fulfils Srxlev>$S_{nonIntraSearchP}$, the UE may choose not to perform inter-frequency measurements.

Else if the satellite distance slope is greater than satellite distance slope threshold and the satellite distance is less than satellite distance threshold or satellite distance trends negative, the UE may choose not to perform inter-frequency measurements Otherwise, the UE shall perform inter-frequency measurements.

If the UE supports relaxed monitoring and s-SearchDeltaP is present in SystemInformationBlockType3-NB, the UE may further limit the needed measurements, as specified in clause 5.2.4.12.

Listing 10

Listing 10 is an example procedure of cell reselection measurement rules.

In the present disclosure, a number of features are described, including (a) a wireless terminal that calculates neighbor cell signal power level slope to determine best suited NTN neighbor cell for cell reselection process, and (b) a wireless terminal that calculates trend of neighbor cell received power level to determine best suited NTN neighbor cell for cell reselection process.

Furthermore, in the present disclosure, additional features were described including (c) a wireless terminal that determines coverage information using satellite elevation angle, (d) a wireless terminal calculates elevation angle changes with respect to time to determine optimum time for performing cell reselection, (e) a wireless terminal that calculates trend of the elevation angles to determine optimum time for performing cell reselection, (f) a wireless terminal that calculates received signal power levels changes with respect to time to determine optimum time for cell reselection, and (g) a wireless terminal that calculates trend of received signal power levels to determine optimum time for performing cell reselection.

Figure 32:
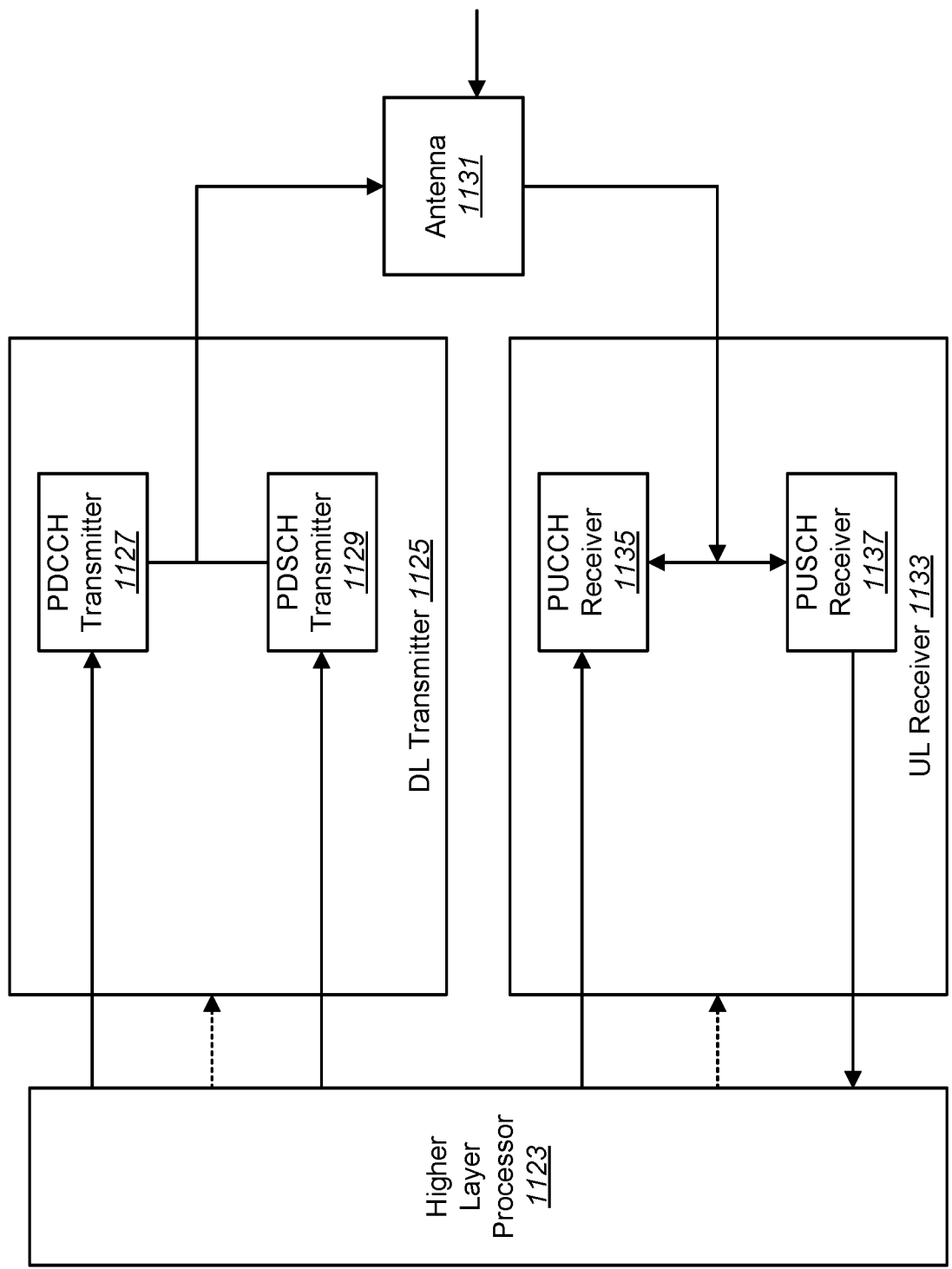
FIG. 32 is a block diagram illustrating one implementation of a gNB.

FIG. 32 is a block diagram illustrating one implementation of a gNB 1160. The gNB 1160 may include a higher layer processor 1123, a DL transmitter 1125, a UL receiver 1133, and one or more antenna 1131. The DL transmitter 1125 may include a PDCCH transmitter 1127 and a PDSCH transmitter 1129. The UL receiver 1133 may include a PUCCH receiver 1135 and a PUSCH receiver 1137.

The higher layer processor 1123 may manage physical layer's behaviors (the DL transmitter's and the UL receiver's behaviors) and provide higher layer parameters to the physical layer. The higher layer processor 1123 may obtain transport blocks from the physical layer. The higher layer processor 1123 may send and/or acquire higher layer messages such as an RRC message and MAC message to and/or from a wireless terminal's higher layer. The higher layer processor 1123 may provide the PDSCH transmitter transport blocks and provide the PDCCH transmitter transmission parameters related to the transport blocks.

The DL transmitter 1125 may multiplex downlink physical channels and downlink physical signals (including reservation signal) and transmit them via transmission antennas 1131. The UL receiver 1133 may receive multiplexed uplink physical channels and uplink physical signals via receiving antennas 1131 and de-multiplex them. The PUCCH receiver 1135 may provide the higher layer processor 1123 UCI. The PUSCH receiver 1137 may provide the higher layer processor 1123 received transport blocks.

Figure 33:
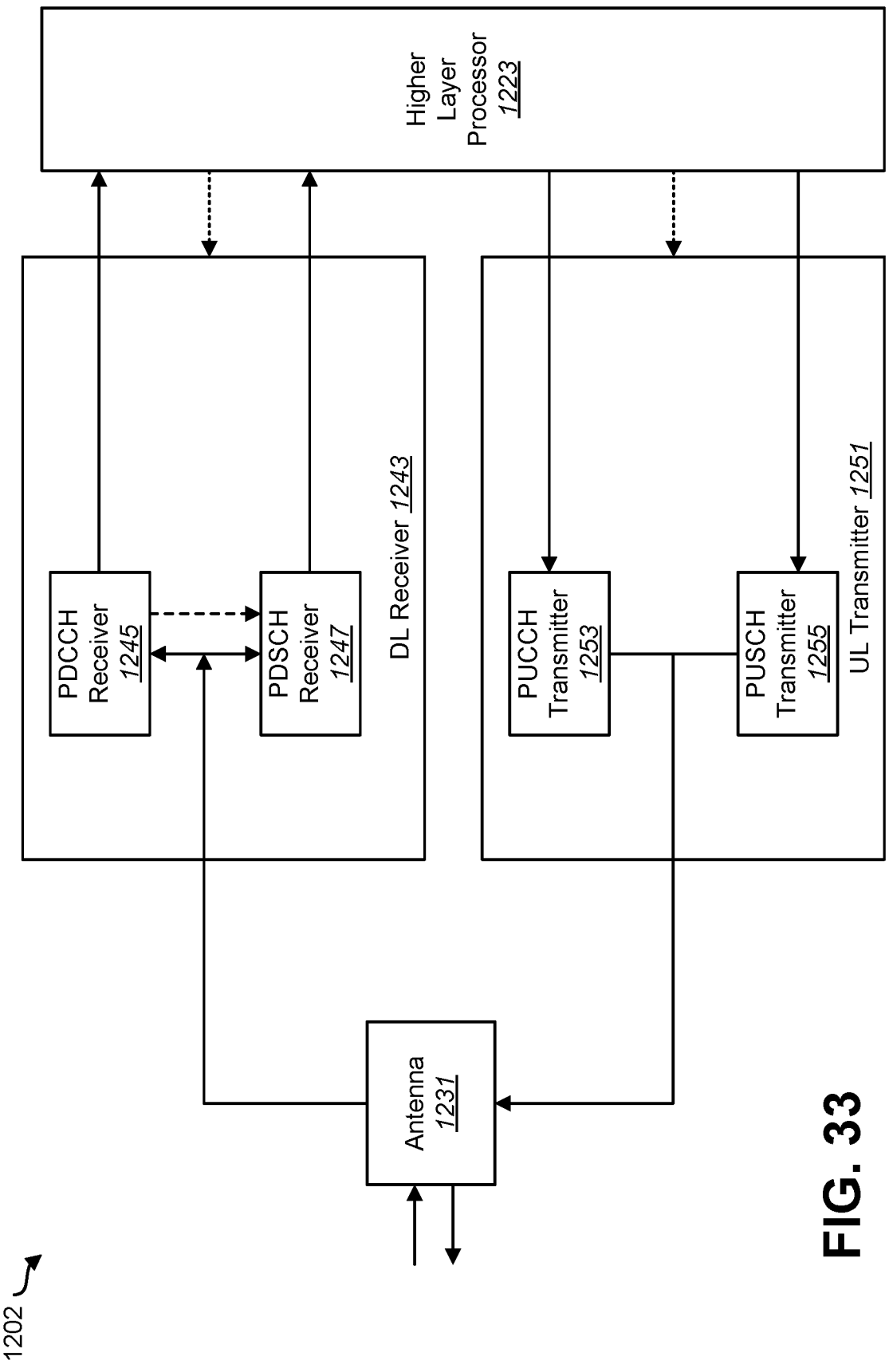
FIG. 33 is a block diagram illustrating one implementation of a wireless terminal.

FIG. 33 is a block diagram illustrating one implementation of a wireless terminal 1202. The wireless terminal 1202 may include a higher layer processor 1223, a UL transmitter 1251, a DL receiver 1243, and one or more antenna 1231. The UL transmitter 1251 may include a PUCCH transmitter 1253 and a PUSCH transmitter 1255. The DL receiver 1243 may include a PDCCH receiver 1245 and a PDSCH receiver 1247.

The higher layer processor 1223 may manage physical layer's behaviors (the UL transmitter's and the DL receiver's behaviors) and provide higher layer parameters to the physical layer. The higher layer processor 1223 may obtain transport blocks from the physical layer. The higher layer processor 1223 may send and/or acquire higher layer messages such as an RRC message and MAC message to and/or from a wireless terminal's higher layer. The higher layer processor 1223 may provide the PUSCH transmitter transport blocks and provide the PUCCH transmitter 1253 UCI.

The DL receiver 1243 may receive multiplexed downlink physical channels and downlink physical signals via receiving antennas 1231 and de-multiplex them. The PDCCH receiver 1245 may provide the higher layer processor 1223 DCI. The PDSCH receiver 1247 may provide the higher layer processor 1223 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 34:
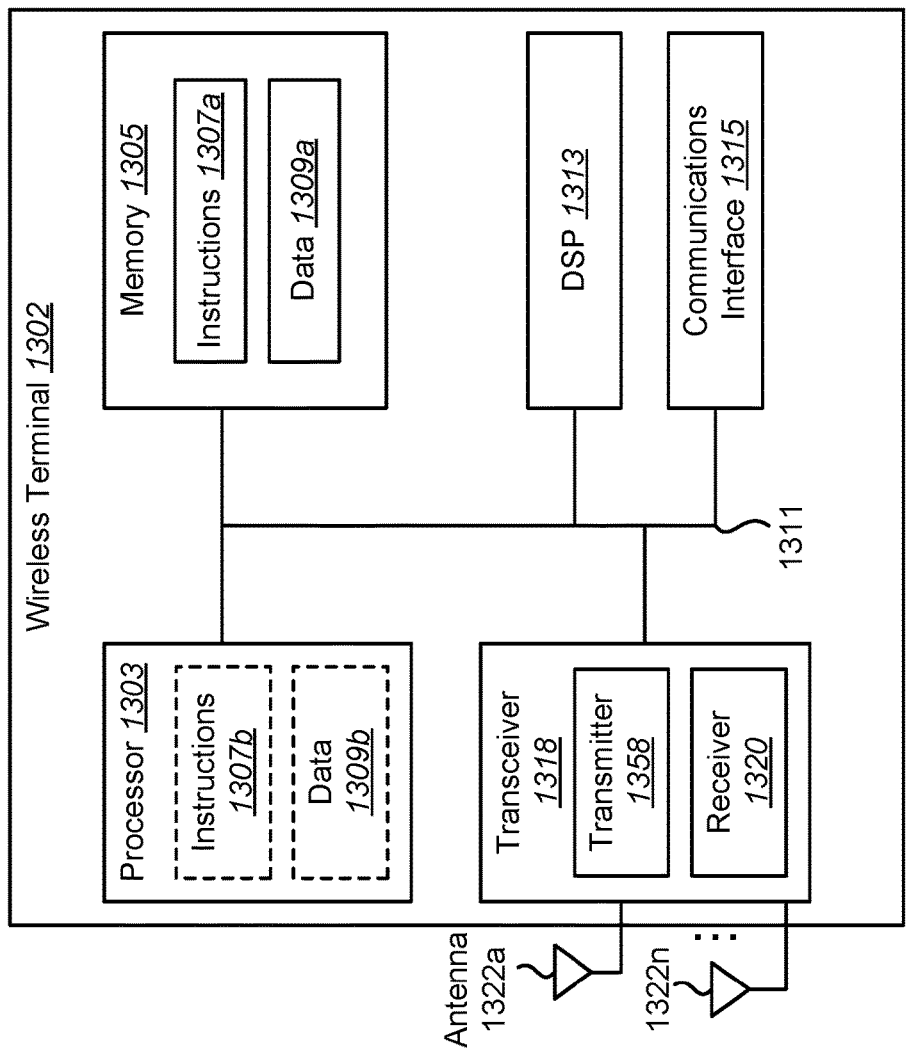
FIG. 34 illustrates various components that may be utilized in a wireless terminal.

FIG. 34 illustrates various components that may be utilized in a wireless terminal 1302. The wireless terminal 1302 described in connection with FIG. 34 may be implemented in accordance with the wireless terminal described herein. The wireless terminal 1302 includes a processor 1303 that controls operation of the wireless terminal 1302. The processor 1303 may also be referred to as a central processing unit (CPU). Memory 1305, which may include read-only memory (ROM), random access memory (RAM), a combination of the two or any type of device that may store information, provides instructions 1307a and data 1309a to the processor 1303. A portion of the memory 1305 may also include non-volatile random-access memory (NVRAM). Instructions 1307b and data 1309b may also reside in the processor 1303. Instructions 1307b and/or data 1309b loaded into the processor 1303 may also include instructions 1307a and/or data 1309a from memory 1305 that were loaded for execution or processing by the processor 1303. The instructions 1307b may be executed by the processor 1303 to implement the methods described above.

The wireless terminal 1302 may also include a housing that contains one or more transmitters 1358 and one or more receivers 1320 to allow transmission and reception of data. The transmitter(s) 1358 and receiver(s) 1320 may be combined into one or more transceivers 1318. One or more antennas 1322a-n are attached to the housing and electrically coupled to the transceiver 1318.

The various components of the wireless terminal 1302 are coupled together by a bus system 1311, which may include a power bus, a control signal bus and a status signal bus, in addition to a data bus. However, for the sake of clarity, the various buses are illustrated in FIG. 34 as the bus system 1311. The wireless terminal 1302 may also include a digital signal processor (DSP) 1313 for use in processing signals. The wireless terminal 1302 may also include a communications interface 1315 that provides user access to the functions of the wireless terminal 1302. The wireless terminal 1302 illustrated in FIG. 34 is a functional block diagram rather than a listing of specific components.

Figure 35:
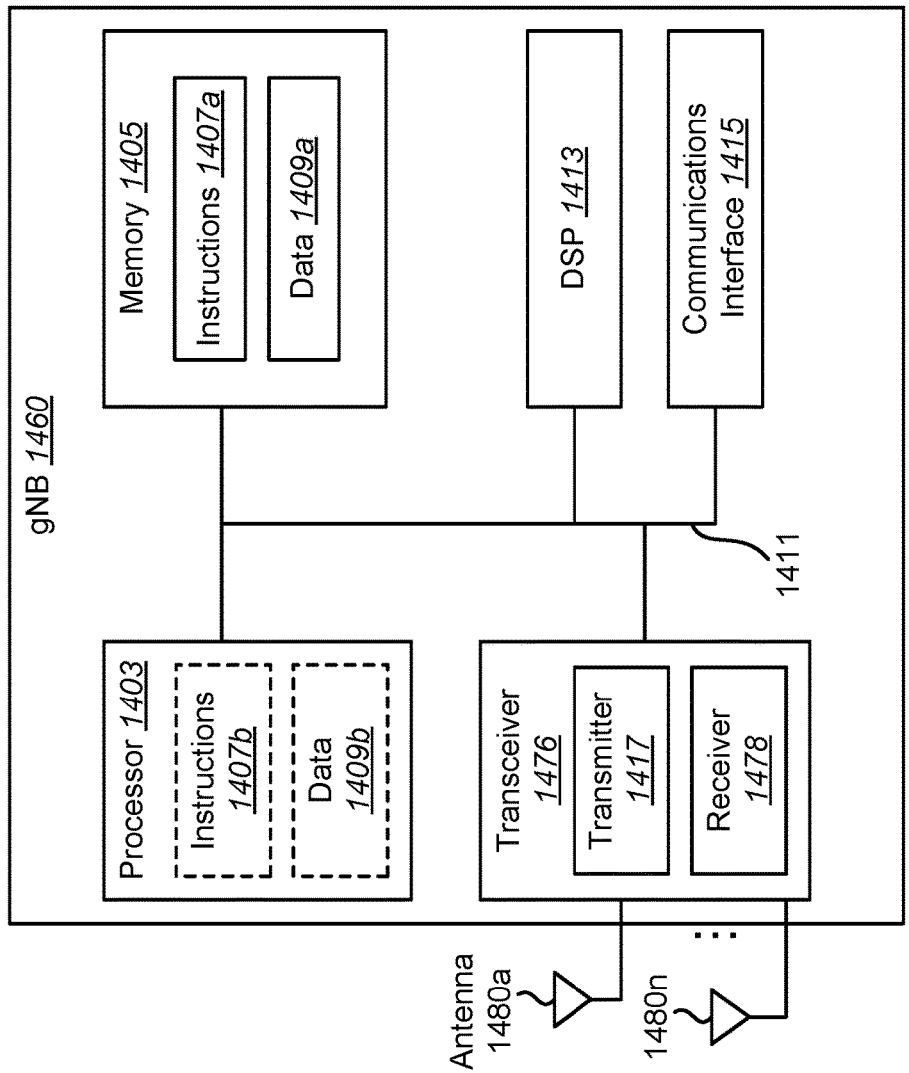
FIG. 35 illustrates various components that may be utilized in a gNB.

FIG. 35 illustrates various components that may be utilized in a gNB 1460. The gNB 1460 described in connection with FIG. 35 may be implemented in accordance with the gNB described herein. The gNB 1460 includes a processor 1403 that controls operation of the gNB 1460. The processor 1403 may also be referred to as a central processing unit (CPU). Memory 1405, which may include read-only memory (ROM), random access memory (RAM), a combination of the two or any type of device that may store information, provides instructions 1407a and data 1409a to the processor 1403. A portion of the memory 1405 may also include non-volatile random-access memory (NVRAM). Instructions 1407b and data 1409b may also reside in the processor 1403. Instructions 1407b and/or data 1409b loaded into the processor 1403 may also include instructions 1407a and/or data 1409a from memory 1405 that were loaded for execution or processing by the processor 1403. The instructions 1407b may be executed by the processor 1403 to implement the methods described above.

The gNB 1460 may also include a housing that contains one or more transmitters 1417 and one or more receivers 1478 to allow transmission and reception of data. The transmitter(s) 1417 and receiver(s) 1478 may be combined into one or more transceivers 1476. One or more antennas 1480a-n are attached to the housing and electrically coupled to the transceiver 1476.

The various components of the gNB 1460 are coupled together by a bus system 1411, which may include a power bus, a control signal bus and a status signal bus, in addition to a data bus. However, for the sake of clarity, the various buses are illustrated in FIG. 35 as the bus system 1411. The gNB 1460 may also include a digital signal processor (DSP) 1413 for use in processing signals. The gNB 1460 may also include a communications interface 1415 that provides user access to the functions of the gNB 1460. The gNB 1460 illustrated in FIG. 35 is a functional block diagram rather than a listing of specific components.

Figure 36:
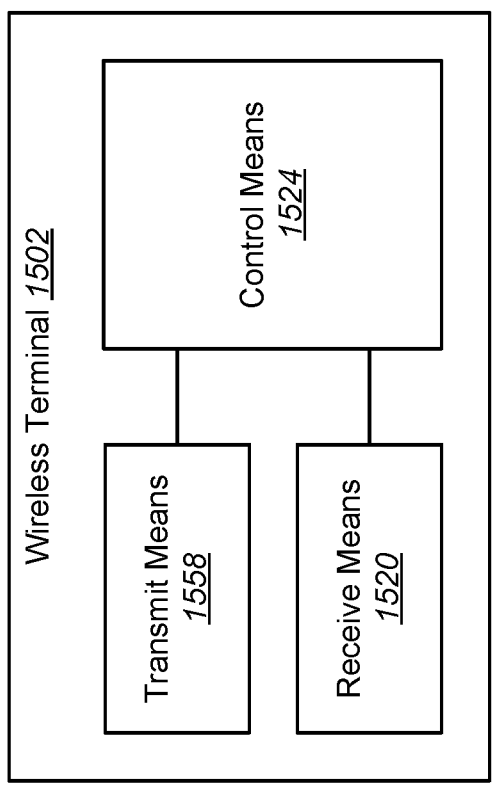
FIG. 36 is a block diagram illustrating one implementation of a wireless terminal in which the present systems and methods may be implemented.

FIG. 36 is a block diagram illustrating one implementation of a wireless terminal 1502 in which systems and methods for resource allocations of enhanced uplink transmissions may be implemented. The wireless terminal 1502 includes transmit means 1558, receive means 1520 and control means 1524. The transmit means 1558, receive means 1520 and control means 1524 may be configured to perform one or more of the functions described herein. FIG. 34 above illustrates one example of a concrete apparatus structure of FIG. 36. Other various structures may be implemented to realize one or more of the functions herein. For example, a DSP may be realized by software.

Figure 37:
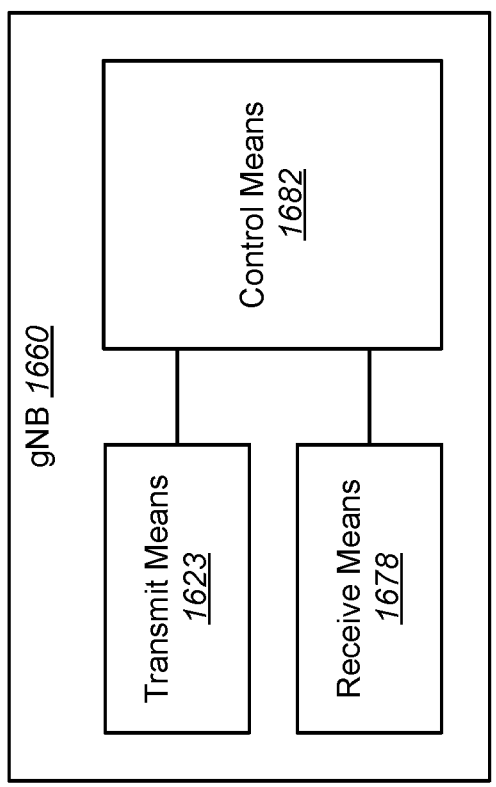
FIG. 37 is a block diagram illustrating one implementation of a gNB in which the present systems and methods may be implemented.

FIG. 37 is a block diagram illustrating one implementation of a gNB 1660 in which systems and methods for resource allocations of enhanced uplink transmissions may be implemented. The gNB 1660 includes transmit means 1623, receive means 1678 and control means 1682. The transmit means 1623, receive means 1678 and control means 1682 may be configured to perform one or more of the functions described herein. FIG. 35 above illustrates one example of a concrete apparatus structure of FIG. 37. Other various structures may be implemented to realize one or more of the functions described herein. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB or the wireless terminal according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB and the wireless terminal according to the systems and methods described above may be realized as an LSI that is a typical integrated circuit. Each functional block of the gNB and the wireless terminal may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned implementations may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

What is claimed is:

1. A wireless terminal, comprising:
   receiving circuitry configured to:
      receive a slope threshold value and a slope interval value indicating a time interval for elevation angle slope calculations;
      calculate an elevation angle slope based on the slope interval value; and
      trigger a cell reselection process based on the elevation angle slope and the slope threshold.

2. The wireless terminal of claim 1, wherein the wireless terminal is using a non-terrestrial network (NTN).

3. A base station (gNB), comprising:
   transmitting circuitry configured to transmit a slope threshold value and a slope interval value indicating a time interval for elevation angle slope calculations;
   wherein the slope interval value and the slope threshold value are used by a wireless terminal to trigger a cell reselection process.

4. A method by a wireless terminal, comprising:
receiving a slope threshold value and a slope interval value indicating a time interval for elevation angle slope calculations;
calculating an elevation angle slope based on the slope interval value; and
triggering a cell reselection process based on the elevation angle slope and the slope threshold.

5. The wireless terminal of claim 1, wherein the cell reselection process is triggered in a case that the elevation slope is less than the slope threshold value.

* * * * *